US010867603B2

(12) United States Patent
Burgueno et al.

(10) Patent No.: US 10,867,603 B2
(45) Date of Patent: Dec. 15, 2020

(54) AUDIO-VIDEO REPRODUCTION DEVICE SETUP USING INTERVIEW-BASED VOICE CONTROL

(71) Applicant: SONY CORPORATION, Tokyo (JP)

(72) Inventors: Allison Burgueno, San Diego, CA (US); Lindsay Miller, San Diego, CA (US); Marvin Demerchant, San Diego, CA (US); Hyehoon Yi, San Diego, CA (US); Tracy Barnes, San Diego, CA (US); David Young, San Diego, CA (US); Yuko Nishikawa, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 113 days.

(21) Appl. No.: 16/169,041

(22) Filed: Oct. 24, 2018

(65) Prior Publication Data

US 2020/0135188 A1     Apr. 30, 2020

(51) Int. Cl.
    *G10L 15/22*     (2006.01)
    *G10L 15/26*     (2006.01)
    *H04N 21/6547*     (2011.01)
    *G06F 9/4401*     (2018.01)
    *G10L 15/00*     (2013.01)

(52) U.S. Cl.
CPC ............ *G10L 15/22* (2013.01); *G06F 9/4411* (2013.01); *G10L 15/005* (2013.01); *G10L 15/26* (2013.01); *H04N 21/6547* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 5,226,090 A | * | 7/1993 | Kimura | H04B 1/46 348/734 |
| 7,809,571 B2 | | 10/2010 | Fukada et al. | |
| 8,498,864 B1 | * | 7/2013 | Liang | G10L 15/22 704/235 |
| 8,788,257 B1 | * | 7/2014 | Su | G06F 40/20 704/2 |

(Continued)

OTHER PUBLICATIONS

Bill Holton, "An Evaluation of the Samsung UN50H6400 Television", Aug. 2014 Issue, vol. 15, No. 8, 10 pages.

*Primary Examiner* — Abul K Azad
(74) *Attorney, Agent, or Firm* — Chip Law Group

(57) ABSTRACT

An audio-video (AV) reproduction device that comprises at least one audio capturing device, at least one speaker, a memory, and circuitry. The memory stores setup information associated with first-time device setup of the audio-video reproduction device. The first-time device setup is associated with a plurality of configuration settings of the AV reproduction device. The circuitry controls the at least one speaker to output a message in the setup information, and controls the at least one audio capturing device to receive a user input based on the message. The circuitry compares the user input with at least one condition associated with the message. The circuitry configures a configuration setting from the plurality of configuration settings based on the comparison. The circuitry controls at least a function of the AV reproduction device based on the configured configuration setting.

20 Claims, 17 Drawing Sheets

(56) References Cited

U.S. PATENT DOCUMENTS

| | | |
|---|---|---|
| 8,849,660 B2 | 9/2014 | Rodriguez et al. |
| 9,271,039 B2 | 2/2016 | Sirpal et al. |
| 10,402,450 B2 * | 9/2019 | Goodman ........... G06F 3/04883 |
| 2007/0260988 A1 | 11/2007 | Miller |
| 2008/0309822 A1 * | 12/2008 | Park ......................... H04N 5/44 |
| | | 348/564 |
| 2013/0132094 A1 * | 5/2013 | Lim ........................ G10L 15/22 |
| | | 704/E11.001 |
| 2019/0281341 A1 * | 9/2019 | Lawrence ........ H04N 21/42203 |

* cited by examiner

US 10,867,603 B2

AUDIO-VIDEO REPRODUCTION DEVICE SETUP USING INTERVIEW-BASED VOICE CONTROL

CROSS-REFERENCE TO RELATED APPLICATIONS/INCORPORATION BY REFERENCE

None.

FIELD

Various embodiments of the disclosure relate to audio-video (AV) reproduction device setup technologies. More specifically, various embodiments of the disclosure relate to audio-video (AV) reproduction device setup using interview-based voice control.

BACKGROUND

Advancements in the field of audio-video (AV) reproduction device have led to development of various technologies for a first-time device setup of the AV reproduction device. Typically, the first-time device setup of the AV reproduction device is performed by a user using a printed guidelines manual provided along with the AV reproduction device. In certain scenarios, the first-time device setup may be performed by the user through certain configuration guidelines displayed on a screen of the AV reproduction device. In such scenarios, a visually impaired user may not able to understand the displayed configuration guidelines and may find difficulties to setup the AV reproduction device for the first time. Such challenges with the visually impaired user may cause an improper first-time device setup. This may further lead to an improper functioning of the AV reproduction device which may be undesirable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for audio-video reproduction device setup using interview-based voice control is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for a first-time device setup of an audio-video (AV) reproduction device using interview-based voice control. Exemplary aspects of the disclosure provide the AV reproduction device that may be configured to store setup information associated with the first-time device setup of the AV reproduction device. The setup information and the first-time device setup may be associated with a plurality of configuration settings of the AV reproduction device. Examples of the plurality of configuration setting may include, but are not limited to, a user language setting, a user identification (ID) setting, a display setting, a network setting, an audio setting, a hardware connection setting, a security and privacy setting, or an accessibility setting. The disclosed AV reproduction device facilitates a two-way audio communication with a user to configure the plurality of configuration settings of the AV reproduction device. The AV reproduction device may include one or more speakers to output a plurality of configuration messages, which are included in the stored setup information, to the user. The AV reproduction device may further include one or more audio capturing devices to receive one or more user inputs from the user in response to the output plurality of configuration messages. The one or more user inputs may be verbal inputs from the user. The disclosed AV reproduction device may configure the plurality of configuration settings based on the comparison of the received one or more verbal inputs from the user and the plurality of configuration messages (as audio message) output through the one or more speakers. The disclosed AV reproduction device may enable the user to setup the AV reproduction device for the first-time based on such two-way audio communication between the user and the AV reproduction device. The AV reproduction device may include an image capturing device to capture one or more images of an external device to be connected with the AV reproduction device. The AV reproduction device may recognize the external device based on the captured one or more images and control the one or more speakers to output one or more user guidance instructions for the user. Thus, an intelligent and advanced AV reproduction device may be provided which may conduct the two-way audio communication with the user to setup the plurality of configuration settings of the AV reproduction device. The disclosed AV reproduction device may improve an experience of a visually impaired user with the first-time device setup procedure due to which the visually impaired user may be able to perform different operations of the AV reproduction device as desired based on the configured settings.

Figure 1:
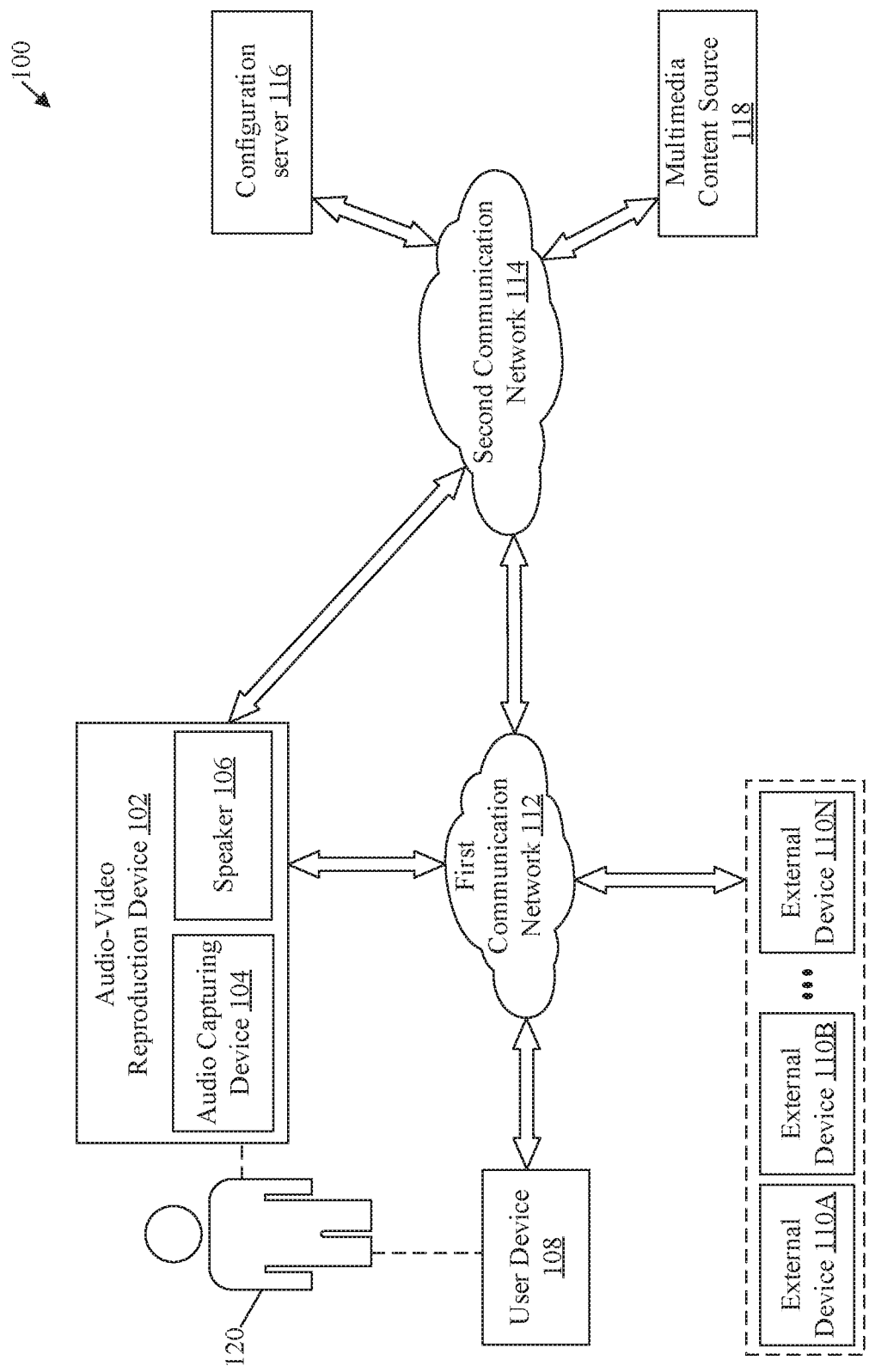
FIG. 1 is a block diagram that illustrates an exemplary network environment for an audio-video reproduction device setup using interview-based voice control, in accordance with an embodiment of the disclosure.

FIG. 1 is a block diagram that illustrates an exemplary network environment for an audio-video reproduction device setup using interview-based voice control, in accordance with an embodiment of the disclosure. With reference to FIG. 1, there is shown a network environment 100. The network environment 100 may include an audio-video (AV) reproduction device 102 which may further include an audio capturing device 104 and a speaker 106. The network environment 100 may further include a user device 108, a plurality of external devices 110A to 110N, a first communication network 112, a second communication network 114, a configuration server 116, a multimedia content source 118, and a user (such as user 120). The AV reproduction device 102 may be communicatively coupled to the user device 108, the plurality of external devices 110A to 110N, the configuration server 116, and the multimedia content source 118, via the first communication network 112 and the second communication network 114.

The AV reproduction device 102 may comprise suitable logic, circuitry and interfaces that may be configured to render multimedia content and control AV functions based on different user inputs received from the user 120. In accordance with an embodiment, the AV reproduction device 102 may be configured to render the multimedia content and control the AV functions based on a plurality of configuration settings set during a first-time device setup of the AV reproduction device 102. Examples of the plurality of configuration settings may include, but are not limited to, a user language setting, a user identification (ID) setting, a display setting, a network setting, an audio setting, a hardware connection setting, a security and privacy setting, or an accessibility setting. Examples of the AV reproduction device 102 may include, but are not limited to an audio-video (AV) entertainment system, a home theatre system, a television system, a display system, a computing device, a gaming device, a sound bar, a car audio receiver, a vehicle infotainment system, a digital versatile disc (DVD) player, a videocassette recorder (VCR) player, camcorders, a mobile phone, a compact disc (CD) player, a server, a computer work-station, and/or smart appliances.

The audio capturing device 104 may comprise suitable logic, circuitry, and/or interfaces that may be configured to receive one or more user inputs (as verbal inputs) corresponding to the setup information from the user 120. Examples of the audio capturing device 104 may include, but are not limited to, an electret microphone, a dynamic microphone, a carbon microphone, a piezoelectric microphone, a fiber microphone, a (micro-electro-mechanical-systems) MEMS microphone, or other microphones known in the art.

The speaker 106 may comprise suitable logic, circuitry, and/or interfaces that may be configured to generate an audio output corresponding to one or more messages (i.e. one or more setup questions or one or more user guidance instructions) included in the setup information associated with the first-time device setup of the AV reproduction device 102. The speaker 106 may be configured to playback the multimedia content provided by the multimedia content source. Examples of the speaker 106 may include, but are not limited to, a loudspeaker, a full-range speaker, a mid-range speaker, a woofer, a subwoofer, a coaxial speaker, a monitor speaker, and a tweeter.

The user device 108 may comprise suitable logic, circuitry and interfaces that may be configured to receive the one or more user inputs (verbal inputs) from the user 120. The user device 108 may be further configured to provide the received one or more user inputs to the AV reproduction device 102 (via the first communication network 112) to setup the plurality of configuration settings of the AV reproduction device 102. The user device 108 may include a memory (not shown) that is configured to store the one or more messages (i.e. one or more setup questions or one or more user guidance instructions) associated with the first-time device setup of the AV reproduction device 102. The one or messages may include a plurality of audio messages and video clips associated with the first-time device setup of the AV reproduction device 102. In accordance with an embodiment, the user device 108 may be configured to receive the one or more messages from the configuration server 116, via the second communication network 114, based on the one or more user inputs received from the user 120. In some embodiments, the user device 108 may be configured to receive the one or more messages from the AV reproduction device 102, via the first communication network 112, based on the one or more user inputs received from the user 120. The user device 108 may be configured output the one or more user guidance instructions to the user 120 via a speaker (not shown) associated with the user device 108. Examples of the user device 108 may include, but are not limited to, a smart speaker, a mobile phone, an audio-video (AV) entertainment system, a computing device, a server, a computer work-station, smart appliance, or an electronic device with capability to receive audio input and generate audio output.

The plurality of external devices 110A to 110N may comprise suitable logic, circuitry and interfaces that may be configured to communicate with the AV reproduction device 102, via the first communication network 112, to provide the multimedia content to the AV reproduction device 102. In accordance with an embodiment, the plurality of external devices 110A to 110N may be configured to receive the multimedia content from the AV reproduction device 102, via the first communication network 112. In accordance with an embodiment, the plurality of external devices 110A to 110N may be configured to store the multimedia content or receive the multimedia content from the multimedia content source 118, via the second communication network. In some embodiments, the plurality of external devices 110A to 110N may be further configured to render the multimedia content.

In some embodiments, the plurality of external devices 110A to 110N may be further configured to communicate with the AV reproduction device 102 to setup a communication setting or a hardware connection setting of the plurality of configuration settings of the AV reproduction device 102. Examples of the plurality of external devices 110A to 110N may include, but are not limited to, an audio-video (AV) entertainment system, a home theatre system, a sound bar, a set top box, a live content streaming device, a display system, a computing device, a gaming device, a car audio receiver, a digital versatile disc (DVD) player, a videocassette recorder (VCR) player, camcorders, a mobile phone, a compact disc (CD) player, a flash drive, or an electronic device with capability to store or render the multimedia content.

The first communication network 112 may include a communication medium through which the AV reproduction device 102 may be communicatively coupled to the plurality of external devices 110A to 110N and the user device 108. Examples of the first communication network 112 may include, but are not limited to, a home network, a Wireless Fidelity (Wi-Fi) network, a Personal Area Network (PAN), or a Local Area Network (LAN). Various devices in the network environment 100 may be configured to connect to the first communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, and Bluetooth (BT) communication protocols.

The second communication network 114 may include a communication medium through which the AV reproduction device 102 may be communicatively coupled to the multimedia content source 118 and the configuration server 116. Examples of the second communication network 114 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the second communication network 114, in accordance with various wired and wireless communication protocols.

The configuration server 116 may comprise suitable logic, circuitry, and interfaces that may be configured to store the setup information related to the plurality of configuration settings of the AV reproduction device 102. The configuration server 116 may be further configured to provide the setup information to the AV reproduction device 102 in response to a setup request from the AV reproduction device 102. The setup request from the AV reproduction device 102 may correspond to a new configuration setting or to update existing configuration settings of the AV reproduction device 102. The configuration server 116 may include one or more databases to store the setup information. Examples of the setup information may include, but are not limited to, manufacture information of the AV reproduction device 102, the one or more setup questions related to the plurality of configuration settings, one or more conditions associated with the one or more setup questions, different processes for setting up hardware connections between the AV reproduction device 102 and the plurality of external devices 110A to 110N, device identification information of the AV reproduction device 102 and the plurality of external devices 110A to 110N, the one or more user guidance instructions related to the plurality of configuration settings, or a number of attempts the user 120 has taken to setup the plurality of configuration settings. The one or more conditions may include all possible responses (i.e. the one or more user inputs) that may correspond to each of the one or more setup questions (or messages). In accordance with an embodiment, the configuration server 116 may store user information of the user 120 of the AV reproduction device 102. In some embodiments, the configuration server 116 may be implemented as a cloud server, which may be utilized to execute aforementioned operations of the configuration server 116 through web applications, cloud applications, HTTP requests, repository operations, file transfer, gaming operations, and the like. Other examples of the server include, but are not limited to a database server, a file server, a web server, an application server, a mainframe server, or other types of server.

The multimedia content source 118 may comprise suitable logic, circuitry, and interfaces that may be configured to store and deliver the multimedia content to the AV reproduction device 102 in response to a content request received from the AV reproduction device 102. The multimedia content source 118 may include one or more databases to store a set of audio feeds or video feeds of different AV programs or channels. Examples of the multimedia content may include, but are not limited to, audio content, video content, animation content, a television AV program, interactive content, VR content, and/or a combination thereof. In some embodiments, the multimedia content source 118 may be implemented as a cloud server, which may be utilized to execute aforementioned operations of the multimedia content source 118 through web applications, cloud applications, HTTP requests, repository operations, file transfer, gaming operations, and the like. Other examples of the server include, but are not limited to a database server, a file server, a web server, an application server, a mainframe server, or other types of server. In accordance with an embodiment, the multimedia content source 118 may be a set top box, a live content streaming device, or a broadcast station. In accordance with an embodiment, the multimedia content source 118 may be a personal media device that may deliver the multimedia content to the AV reproduction device 102. Examples of the personal media device may include, but are not limited to, a smartphone, a music player, a video player, a laptop, a personal computer, a personal external storage, and a flash drive.

In operation, the AV reproduction device 102 may be configured to initiate the first-time device setup based on a detection that the AV reproduction device 102 is turned on for the first time. In accordance with an embodiment, AV reproduction device 102 may be configured to initiate the first-time device setup based on the one or more user inputs received from the user 120. The AV reproduction device 102 may be configured to store the setup information associated with the first-time device setup of the AV reproduction device 102. The first-time device setup may be associated with the plurality of configuration settings of the AV reproduction device 102. The AV reproduction device 102 may be configured to control the speaker 106 to output a message in the setup information for the user 120. In accordance with an embodiment, the message may correspond to a setup question for the user 120. In some embodiments, the AV reproduction device 102 may output the message as an AV output. In accordance with an embodiment, the AV reproduction device 102 may retrieve the message of the setup information from the configuration server 116.

In accordance with an embodiment, the AV reproduction device 102 may be further configured to control the audio capturing device 104 to receive a user input (as a verbal input) of the one or more user inputs from the user 120, in response to the message output through the speaker 106. The AV reproduction device 102 may be further configured to retrieve a condition from the one or more conditions based on the reception of the user input. The retrieved condition may be associated with the message output via the speaker 106. The AV reproduction device 102 may be further configured to compare the received user input with the retrieved condition associated with the message.

In accordance with an embodiment, the AV reproduction device 102 may further configure a configuration setting from the plurality of configuration settings of the AV reproduction device 102, based on the comparison of the received user input and the retrieved condition. In accordance with an embodiment, the plurality of configuration settings may include hardware settings of the AV reproduction device 102. In some embodiments, the one or more settings may include software settings of the AV reproduction device 102. The setup of the plurality of configuration settings is described in detail, for example, in FIGS. 3A, 3B, 3C, 3D, 3E, 4, 5A, 5B, 6, 7, 8A, 8B, and 8C.

In accordance with an embodiment, the AV reproduction device 102 may be further configured to store the configured plurality of configuration settings in a memory (not shown) of the AV reproduction device 102. The AV reproduction device 102 may be further configured to control one or more functions of the AV reproduction device 102 based on the stored plurality of configuration settings. Examples of the one or more functions may include, but are not limited to, accessibility features, display characteristics of displayed information, preferred language to render information, closed captioning, audio characteristics of output sound, network authentication, user authentication, communication protocol used between the AV reproduction device 102 and the plurality of external devices 110A to 110N, electronic program guide (EPG) control, energy saving, or content source selection. Thus, the disclosed AV reproduction device 102 may enable the two-way audio communication with the user 120 to configure the plurality of configuration settings of the AV reproduction device 102. This may further improve new device experience of the visual improved user (such as the user 120) for the first-time setup and various operations of the AV reproduction device 102.

In accordance with an embodiment, the AV reproduction device 102 may be configured to receive the user input, via the user device 108. The user device 108 may be configured to receive, through an audio capturing device (such as audio capturing device 304 of FIG. 3A) of the user device 108, the user input (as verbal input) from the user 120. The user device 108 may be configured to provide the received user input to the AV reproduction device 102, via the first communication network 112. The AV reproduction device 102 may be further configured to transmit, via the first communication network 112, the one or more user guidance instructions to the user device 108, in response to the received user input. The user device 108 may be further configured to output the one or more user guidance instructions (as audio output) to the user 120 through a speaker (such as speaker 306 of FIG. 3A) associated with the user device 108 to setup the plurality of configuration settings of the AV reproduction device 102. The communication between the AV reproduction device 102, the user device 108, and the user 120 for the first-time device setup may be described in detail, for example, in FIGS. 3A, 3B, 3C, 3D, and 3E.

In accordance with an embodiment, the user device 108 may act as a communication interface between the user 120 and the AV reproduction device 102. In accordance with an embodiment, the user device 108 may be configured to store the setup information associated with the first-time device setup of the AV reproduction device 102. The user device 108 may be configured to control the speaker 306 (shown in FIG. 3A) to output the one or more messages in the setup information for the user 120. In some embodiments, the user device 108 may retrieve the one or more messages in the setup information from the configuration server 116. In accordance with an embodiment, the user device 108 may be further configured to control the audio capturing device 304 (shown in FIG. 3A) to receive the one or more user inputs (as verbal inputs) from the user 120, in response to the one or more messages output through the speaker 306 (shown in FIG. 3A). The user device 108 may be further configured to compare the received one or more user inputs with the one or more conditions associated with the one or more messages.

In accordance with an embodiment, the user device 108 may be further configured to identify information associated with a configuration setting from the plurality of configuration settings of the AV reproduction device 102 based on the comparison of the received one or more user inputs and the one or more conditions. In accordance with an embodiment, the user device 108 may be further configured to transmit the identified information associated with the configuration setting to the AV reproduction device 102. Thus, the user 120 may be able to configure the configuration settings of the AV reproduction device 102 through the user device 108.

Figure 2:
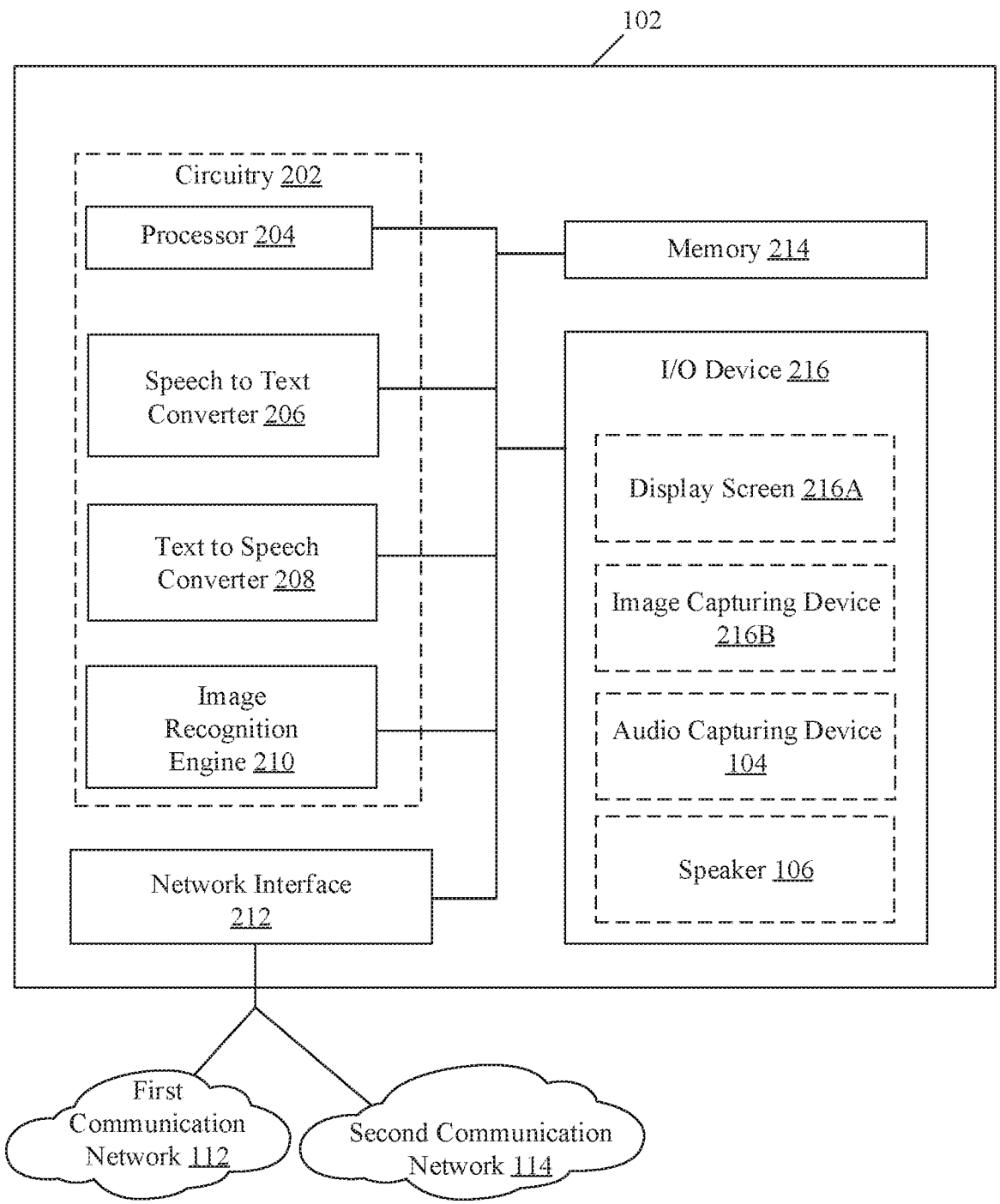
FIG. 2 is a block diagram that illustrates an exemplary audio-video (AV) reproduction device of FIG. 1, in accordance with an embodiment of the disclosure.

FIG. 2 is a block diagram that illustrates an exemplary audio-video (AV) reproduction device of FIG. 1, in accordance with an embodiment of the disclosure. FIG. 2 is explained in conjunction with elements from FIG. 1. With reference to FIG. 2, there is shown a block diagram 200 of the AV reproduction device 102. The AV reproduction device 102 may include circuitry 202 which may further include a processor 204, a speech-to-text converter 206, a text-to-speech converter 208, and an image recognition engine 210. The AV reproduction device 102 may further include a network interface 212, a memory 214, and an input/output (I/O) device 216. The I/O device 216 may include a display screen 216A, the audio capturing device 104, an image capturing device 216B, and the speaker 106. The circuitry 202 may be communicatively coupled to the memory 214 and the I/O device 216. The circuitry 202 may be configured to communicate with the multimedia content source 118, the configuration server 116, and the plurality of external devices 110A to 110N, by use of the network interface 212.

The processor 204 may comprise suitable logic, circuitry, and/or interfaces that may be configured to execute a set of instructions stored in the memory 214. The processor 204 may be configured to setup the plurality of configuration settings of the AV reproduction device 102 based on the two-way audio communication between the AV reproduction device 102 and the user 120. In accordance with an embodiment, the processor 204 may be configured to provide the one or more messages to the text-to-speech converter 208, and control the speaker 106 to output the one or more messages to the user 120. The processor 204 may be further configured to control the audio capturing device 104 to receive the one or more user inputs from the user 120 in response to the one more messages. The processor 204 may further configure the plurality of configuration settings of the AV reproduction device 102 based on the received one or more user inputs. In accordance with an embodiment, the processor 204 may be further configured to control the one or more functions of the AV reproduction device 102 based on the configured plurality of configuration settings. In accordance with an embodiment, the processor 204 may be configured to control the speech-to-text converter 206, the text-to-speech converter 208, the image recognition engine 210, the memory 214, and the input/output (I/O) device 216 to configure the plurality of configuration settings and control the one or more functions of the AV reproduction device 102.

The processor 204 may be implemented based on a number of processor technologies known in the art. Examples of implementations of the processor 204 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), or other control circuits.

The speech-to-text converter 206 may comprise suitable logic, circuitry, and/or interfaces that may be configured to convert the one or more user inputs (as verbal inputs) received from the audio capturing device 104 into a text form or an executable form which may be understandable by the processor 204 to configure the plurality of configuration settings. The speech-to-text converter 206 may be configured to provide the converted one or more user inputs (i.e. in text form or processor executable form) to the processor 204 to identify a set of executable instructions specified in the one or more user inputs. Examples of implementations of the speech to text converter 206 may be a specialized circuitry, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), or other control circuits.

The text-to-speech converter 208 may comprise suitable logic, circuitry, and/or interfaces that may be configured to convert data received from the processor 204 in text form (or a computer readable form) into an audio output to be communicated to the user 120 via the speaker 106 as the one or more messages. In accordance with an embodiment, the data received from the processor 204 may include the one or more messages (i.e. the one or more setup questions or the user guidance instructions). Examples of implementations of the text-to-speech converter 208 may be a specialized circuitry, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), or other control circuits.

The image recognition engine 210 may comprise suitable logic, circuitry, and/or interfaces that may be configured to recognize the user 120 or the plurality of external devices 110A to 110N based on one or more images captured by the image capturing device 216B. In accordance with an embodiment, the image recognition engine 210 may be further configured to recognize the user 120 or the plurality of external devices 110A to 110N based a set of sample images stored in the memory 214. Examples of implementations of the image recognition engine 210 may be a specialized circuitry, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), or other control circuits.

The network interface 212 may comprise suitable logic, circuitry, and/or interfaces that may be configured to establish a communication between the AV reproduction device 102, the user device 108, the plurality of external devices 110A to 110N, the configuration server 116, and the multimedia content source 118, via the first communication network 112 and the second communication network 114. The network interface 212 may be implemented by use of various known technologies to support wired or wireless communication of the AV reproduction device 102 with the first communication network 112 and the second communication network 114. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer.

The memory 214 may comprise suitable logic, circuitry, and/or interfaces that may be configured to store a set of instructions executable by the processor 204, the speech-to-text converter 206, the text-to-speech converter 208, and the image recognition engine 210. In accordance with an embodiment, the memory 214 may be further configured to store, for example, the setup information which includes the one or more messages (i.e. the one or more setup questions, the one or more user guidance instructions), the one or more conditions associated with the one or more messages, one or more sample images of the plurality of external devices 110A to 110N, device identification information of the plurality of external devices 110A to 110N, information of communication connection between the AV reproduction device 102 and the plurality of external devices 110A to 110N, or the user information related to the user 120. In some embodiments, the memory 214 may be configured to store the multimedia content to be rendered by the AV reproduction device 102. Examples of implementation of the memory 214 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 216 may comprise suitable logic, circuitry, and/or interfaces that may be configured to act as an I/O channel/interface between the user 120 and the different operational components of the AV reproduction device 102. The I/O device 216 may be configured to receive the one or more user inputs from the user 120 and provide the received one or more user inputs to one of the processor 204, the speech-to-text converter 206, and the image recognition engine 210. The I/O device 216 may be configured to receive an output from the processor 204 or the text-to-speech converter 208 and provide the received output to the user 120. The I/O device 216 may comprise various input and output devices, which may be configured to communicate with different operational components of the AV reproduction device 102. Examples of the I/O device 216 may include, but are not limited to, a touch screen, a keyboard, a mouse, a joystick, a microphone (for example the audio capturing device 104), a display screen (for example the display screen 216A), a speaker (for example the speaker 106), and an image capturing device (for example the image capturing device 216B).

The display screen 216A may comprise suitable logic, circuitry, and/or interfaces that may be configured to render the multimedia content and the one or more messages (i.e. the one or more setup questions or the one or more user guidance instructions) for the user 120. In accordance with an embodiment, the display screen 216A may be a touch screen to receive the one or more user inputs from the user 120. The touch screen may be at least one of, but is not limited to, a resistive touch screen, a surface acoustic wave touch screen, or a capacitive touch screen. The display screen 216A may be realized through several known technologies such as, but not limited to, at least one of a Liquid Crystal Display (LCD) display, a Light Emitting Diode (LED) display, a plasma display, or an Organic LED (OLED) display technology, or other display screens. In accordance with an embodiment, the display screen 216A may refer to a display screen of a smart-glass device, a see-through display, a projection-based display, an electrochromic display, or a transparent display. In accordance with an embodiment, the display screen 216A may be an external display screen that may be connected to the AV reproduction device 102.

The image capturing device 216B may comprise suitable logic, circuitry, and/or interfaces that may be configured to capture the one or more images of the plurality of external devices 110A to 110N or the user 120. The image capturing device 216B may be configured to provide the captured one or more images to the processor 204 or the image recognition engine 210. In accordance with an embodiment, the image capturing device 216B may be positioned at a particular location in a three-dimensional (3D) space and may be communicably coupled to the AV reproduction device 102. Examples of the image capturing device 216B may include, but are not limited to, an image sensor, a wide-angle camera, an action camera, a closed-circuit television (CCTV) camera, a camcorder, a time-of-flight camera (TOF camera), a digital camera, a night-vision camera, a video recorder, and/or other image capturing devices.

The functions or operations executed by the AV reproduction device 102, as described in FIG. 1, may be executed by the processor 204, the speech-to-text converter 206, the text-to-speech converter 208, and the image recognition engine 210 are further described, for example, in the FIGS. 3A, 3B, 3C, 3D, 3E, 4, 5A and 5B, 6, 7, 8A, 8B, 8C, and 9.

FIGS. 3A, 3B, 3C, 3D, and 3E, collectively, illustrate a first exemplary scenario for first-time device setup of the AV reproduction device setup of FIG. 2 using interview-based voice control, in accordance with an embodiment of the disclosure. FIGS. 3A, 3B, 3C, 3D, and 3E are explained in conjunction with elements from FIGS. 1 and 2.

Figure 3A:
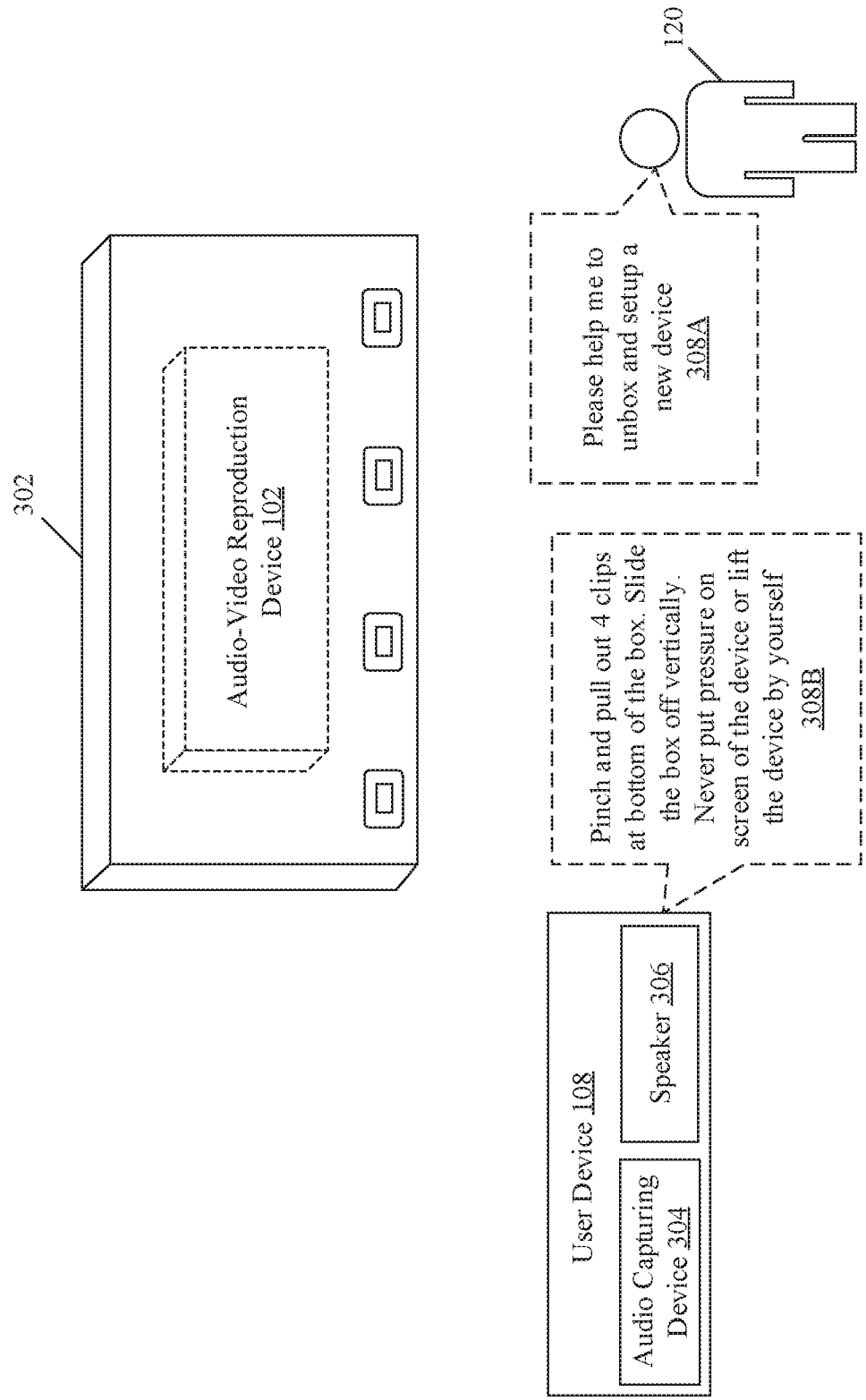
FIGS. 3A, 3B, 3C, 3D, and 3E, collectively, illustrate a first exemplary scenario for first-time device setup of the AV reproduction device of FIG. 2 using interview-based voice control, in accordance with an embodiment of the disclosure.

With reference to FIG. 3A, there is shown a box (or carton) 302 which may include the AV reproduction device 102. The AV reproduction device 102 may be packed in the box 302 after a purchase of the AV reproduction device 102. In FIG. 3A, there is also shown the user device 108, and the user 120. The user device 108 may be configured to receive (through an audio capturing device 304 of the user device 108) a user input 308A (verbal input) from the user 120. The user input 308A may be a request to provide assistance to unbox the AV reproduction device 102 from the box 302 and perform the first-time device setup of the AV reproduction device 102. For example, the user 120 may say "Please help me to unbox and setup new device" as the first user input 308A. In accordance with an embodiment, the first user input 308A may include the device identification information of the AV reproduction device 102. The device identification information may be a model number of the AV reproduction device 102 mentioned or printed on the box 302.

The user device 108 may be further configured to recognize the received user input 304A and transmit a request to the configuration server 116 to provide user guidance information to unbox the AV reproduction device 102 from the box 302. The user device 108 may be configured to receive the user guidance information from the configuration server 116 based on the transmitted request. In accordance with an embodiment, the user device 108 may be configured to receive the user guidance information from the multimedia content source 118. The user guidance information may include the multimedia content (for example audio-video content) to unbox the AV reproduction device 102.

In accordance with an embodiment, the user device 108 may be configured to control a speaker 306 (associated with the user device 108) to output a message 308B to the user 120. The message 308B may include the user guidance information. In accordance with an embodiment, the message 308B may be an unboxing guidelines or tutorial for the user 120 to unbox the AV reproduction device 102 from the box 302. For example, the message 308B may be "Pinch and pull out 4 clips at bottom of the box. Slide the box off vertically" as shown in FIG. 3A. In some embodiments, the message 308B may indicate one or more safety guidelines for the user 120 to unbox the AV reproduction device 102. For example, the one or more safety guidelines may be "Never put pressure on screen of the device or lift the device by yourself" as shown in FIG. 3A. In accordance with an embodiment, the message 308B may include information related to accessories (for example cables) of the AV reproduction device 102, information related to physical installation of the AV reproduction device 102, or information related to power the AV reproduction device 102 using different power sources (for example AC or DC power supplies).

Figure 3B:
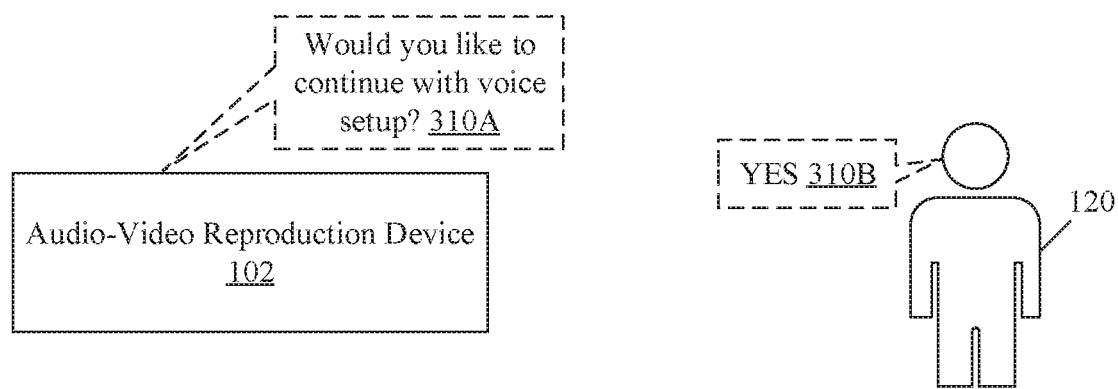

With reference to FIG. 3B, there is shown a scenario where the AV reproduction device 102 may be powered-on for the first time and the processor 204 may initiate the first-time device setup of the AV reproduction device 102. The processor 204 may be configured to control the speaker 106 to output a first setup question 310A of the one or more messages (or the one or more setup questions) stored in the memory 214. In accordance with an embodiment, the first setup question 310A may be "Would you like to continue with voice setup?". In accordance with an embodiment, the first setup question 310A may be an audio message output by the speaker 106 to the user 120. In some embodiments, the first setup question 310A may also be displayed on the display screen 216A. The processor 204 may further be configured to control the audio capturing device 104 to receive a first user input 310B (for example, a verbal input) from the user 120 in response to the first setup question 310A. In accordance with an embodiment, the first user input 310B may be "Yes" (as shown in FIG. 3B) in response to the first setup question 310A. The first user input 310B (for example "Yes") may indicate a confirmation from the user 120 with respect to the first setup question 310A output from the AV reproduction device 102 through the speaker 106.

In accordance with an embodiment, the processor 204 may be configured to provide the received first user input 310B (as verbal input) to the speech-to-text converter 206. The speech-to-text converter 206 may be configured to convert the received first user input 310B into the text form and may provide the text form of the received first user input 310B to the processor 204. The processor 204 may be further configured to retrieve a first condition with respect to the first setup question 310A from the memory 214. The processor 204 may be further configured to compare the text form of the received first user input 310B with the first condition retrieved from the memory 214. The first condition may indicate a possible response (as the first user input 310B) for the first setup question 310A. In accordance with an embodiment, the first condition may be, for example, "Yes" or "No". In case, the received first user input 310B matches with the first condition (say "Yes"), the processor 204 may be further configured to continue with an interview-based voice controlled setup of the AV reproduction device 102. In the interview-based voice controlled setup, the processor 204 may be configured to output the one or more messages (i.e. setup questions or user guidance instructions) in the setup information through the speaker 106 to the user 120, and further receive the one or more user inputs (as verbal response) from the user 120 through the audio capturing device 104 to configure the plurality of configuration settings. In accordance with an embodiment, in case, the received first user input 310B does not match with the first condition (say "Yes") associated with the first setup question 310A, the processor 204 may be further configured to discard the first user input 310B or continue with display-based setup of the AV reproduction device 102.

Figure 3C:
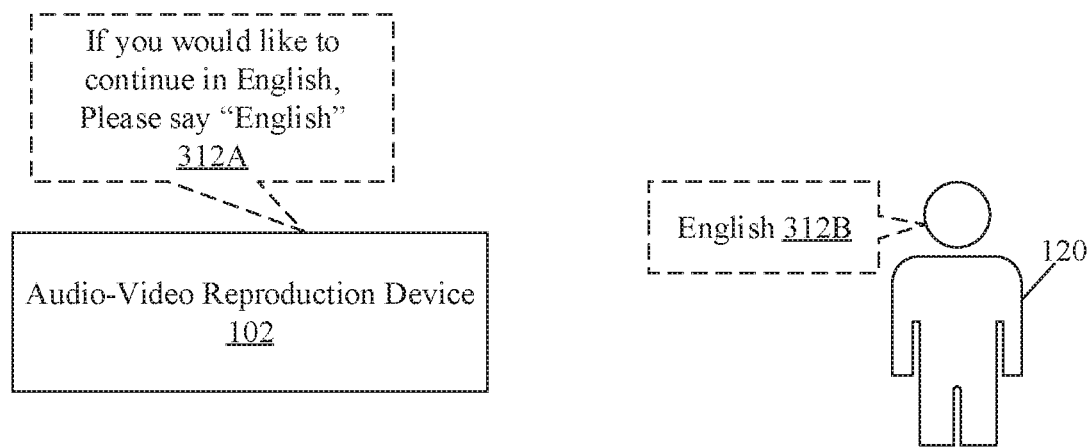

With respect to FIG. 3C, there is shown a second setup question 312A output from the AV reproduction device 102 and a second user input 312B (as verbal input) received from the user 120. The processor 204 may configure the user language setting based on the second setup question 312A and the second user input 312B.

In accordance with an embodiment, the processor 204 may be configured to setup a first configuration setting as the user language setting, in the interview-based voice controlled setup. In accordance with an embodiment, the processor 204 may be configured to control the speaker 106 to output the second setup question 312A in the setup information to the user 120. The second setup question 312A may be output in a default language for the user 120 to set a preferred language and continue with the interview-based voice controlled setup of the AV reproduction device 102 based on the preferred language. In accordance with an embodiment, the second setup question 312A may be "If you would like to continue in English, Please say "English". In accordance with an embodiment, the processor 204 may be configured to select the default language based on a geographical location of the AV reproduction device 102. The processor 204 may be configured to determine the geographical location (for example using inbuilt GPS component) of the AV reproduction device 102. For example, in case the detected geographical location may be USA, the processor 204 may be configured to select "English" as the default language and output the second setup question 312A. Examples of the default language may include, but are not limited to, English, Spanish, German, French, or Japanese.

In accordance with an embodiment, the processor 204 may be further configured to receive the second user input 312B (as verbal input) from the user 120, through the audio capturing device 104, in response to the second setup question 312A. The processor 204 may be further configured to provide the received second user input 312B (as verbal input) to the speech-to-text converter 206 and acquire the text form of the received second user input 312B from the speech-to-text converter 206. The processor 204 may be further configured to compare the text form of the received second user input 312B with a second condition (of the one or more conditions) associated with the second setup question 312A. In accordance with an embodiment, the second condition may be, for example, "English, Spanish, German, French, or Japanese" based on the second setup question 312A. In case, the second user input 312B matches with "English" as the second condition, the processor 204 may configure the first configuration setting (as the user language setting) as "English". In accordance with an embodiment, the processor may be further configured to output the one or more messages (i.e. the one or more setup questions) of the setup information in a language (for example English) configured in the user language setting of the AV reproduction device 102.

Figure 3D:
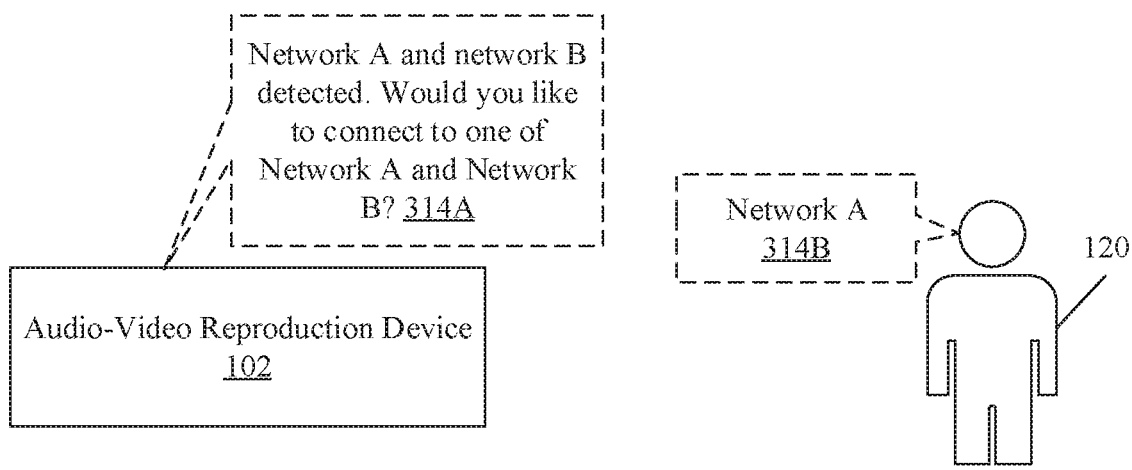
Figure 3E:
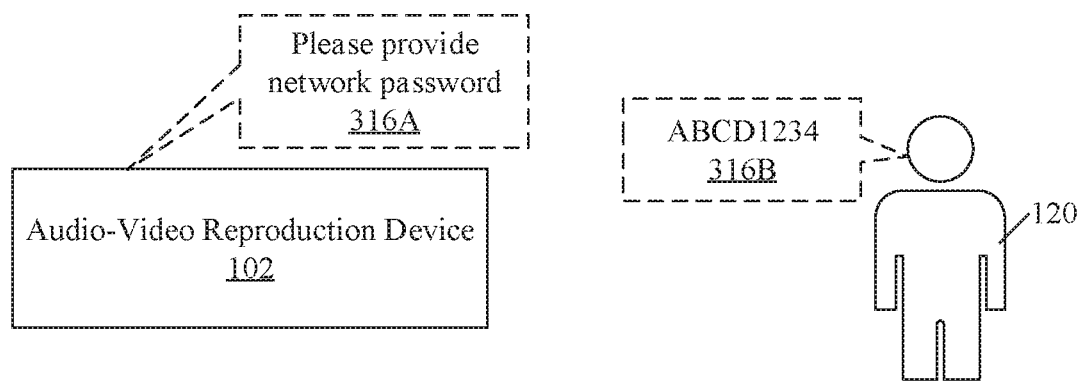

With respect to FIGS. 3D and 3E, there is shown a third setup question 314A and a fourth setup question 316A output from the AV reproduction device 102 and a third user input 314B and a fourth user input 316B (as verbal inputs) received from the user 120. The processor 204 may configure the network setting based on the third setup question 314A and the third user input 314B, the fourth setup question 316A, and the fourth user input 316B.

In accordance with an embodiment, the processor 204 may be configured to detect one or more wireless networks within a specific range of the AV reproduction device 102. For example, the detected one or more networks may include, but are not limited to, "Network A" and "Network B". In accordance an embodiment, the processor 204 may be further configured to control the speaker 106 to output the third setup question 314A in the setup information to the user 120, based on the detection of the one or more networks. In accordance with an embodiment, the third setup question 314A may be "Network A and Network B detected. Would you like to connect to one of Network A and Network B?" as shown in FIG. 3D. The processor 204 may be further configured to control the audio capturing device 104 to receive the third user input 314B (as verbal input) from the user 120, in response to the third setup question 314A. For example, the third user input 314B may be "Network A" as shown in FIG. 3D. In such case, the processor 204 may configure the network setting for the Network A. In case, where the third user input 314B received from the user 120 correspond to "Network B," the processor 204 may configure the network setting for the Network B. The processor 204 may be configured to provide the received third user input 314B (as verbal input) to the speech-to-text converter 206, and acquire the text form (or computer understandable form) of the received third user input 314B from the speech-to-text converter 206. The processor 204 may be further configured to compare the converted third user input 314B with a third condition associated with the third setup question 314A. In accordance with an embodiment, the processor 204 may be configured to retrieve the third condition associated with the third setup question 314A from the memory 214. The third condition retrieved from the memory 214 may be, for example, "Network A," "Network B," or "No".

With respect to FIG. 3E, the processor 204 may configure a network password for the configured network based on the fourth setup question 316A, and the fourth user input 316B. The processor 204 may be configured to control the speaker 106 to output the fourth setup question 316A in the setup information for the user 120. The fourth setup question 316A may be, but is not limited to, "Please provide network password". In accordance with an embodiment, the processor 204 may be further configured to control the audio capturing device 104 to receive the fourth user input 316B (as verbal input) from the user 120 in response to the fourth setup question 316A. The fourth user input 316B may correspond to alphanumeric password received from the user 120 (for example, "ABCD1234" as shown in FIG. 3E). The processor 204 may be further configured to convert the received fourth user input 316B (through the speech-to-text converter 206) and store the converted fourth user input 316B (in the text form or the computer understandable form) as the network password for the configured network.

Similar to the user language setting and the network setting (as described with respect to FIGS. 3C, 3D and 3E), the processor 204 may be further configured to setup various other configuration settings associated with the first-time device setup of the AV reproduction device 102, based on the interview-based voice controlled setup. Examples of the other configuration settings may include, but are not limited to, the display setting, the audio setting, the hardware connection setting, the accessibility setting, the user identification (ID) setting, or the security and privacy setting. Therefore, the interview-based voice controlled setup of the plurality of configuration settings of the AV reproduction device 102 enables the user 120 (or the visually impaired user) to effectively setup the AV reproduction device 102 for the first time such that the user 120 may experience different functions of the AV reproduction device 102 as desired.

Figure 4:
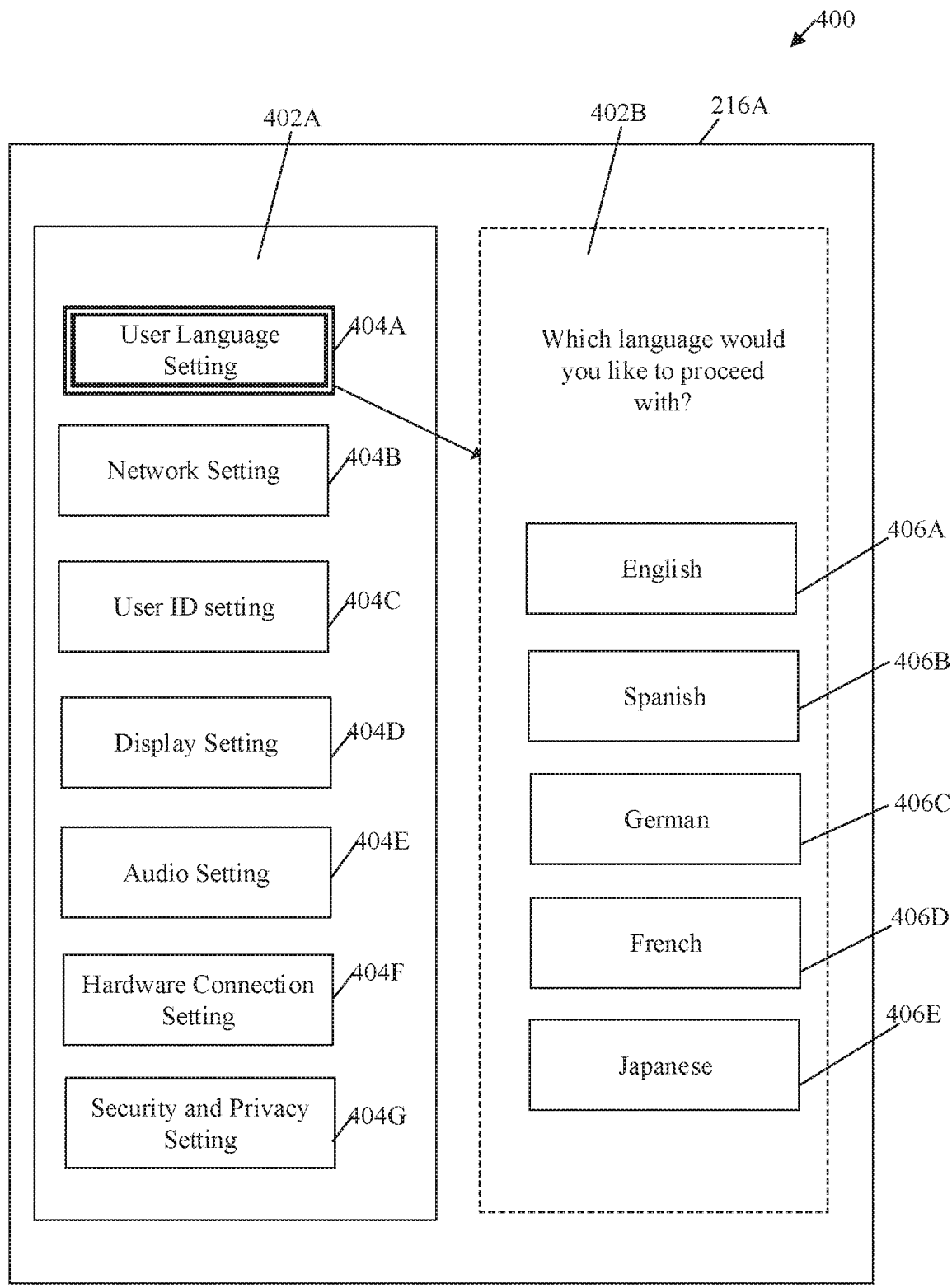
FIG. 4 illustrates an exemplary first user interface for first-time device setup of the AV reproduction device of FIG. 2 using interview-based voice control, in accordance with an embodiment of the disclosure.

FIG. 4 illustrates an exemplary first user interface for the first-time device setup of the AV reproduction device of FIG. 2 using interview-based voice control, in accordance with an embodiment of the disclosure. FIG. 4 is explained in conjunction with elements from FIGS. 1, 2, 3A, 3B, 3C, 3D, and 3E. With reference to the FIG. 4, there is shown a first user interface (UI) 400 displayed on the display screen 216A for the first-time device setup of the AV reproduction device 102. The UI 400 may further include a first display portion 402A and a second display portion 402B. The first display portion 402A may include a plurality of UI elements 404A to 402G related to the plurality of configuration settings. The plurality of UI elements 404A to 404G may be displayed in an order in which the plurality of configuration settings may be configured in the first-time device setup. In accordance with an embodiment, the first display portion 402A may also indicate a current configuration setting (for example user language setting 404A in FIG. 4) being configured during the first-time device setup. The second display portion 402B may indicate detailed information with respect to the current configuration setting. With respect to FIG. 4, the detailed information for the user language setting 404A may include a plurality of UI options 406A to 406E. In accordance with an embodiment, the plurality of UI options 406A to 406E may include different languages (for example English, Spanish, German, French, Japanese) predefined for the user language setting 404A.

In accordance with an embodiment, the processor 204 may be configured to control the speaker 106 to output the detailed information displayed in the second display portion 402B. In accordance with an embodiment, the text-to-speech converter 208 may be configured to convert the detailed information displayed in the second display portion 402B and provide the converted information to the speaker 106 to output the plurality of UI options 406A to 406E to the user 120. The interview-based voice controlled setup of the user language setting may be described in detail, for example, in FIG. 3C. In accordance with an embodiment, the processor 204 may be configured to receive a touch-based input on the plurality of UI options 406A to 406E from the user 120 to select the preferred language and configure the user language setting of the AV reproduction device 102.

Figure 5A:
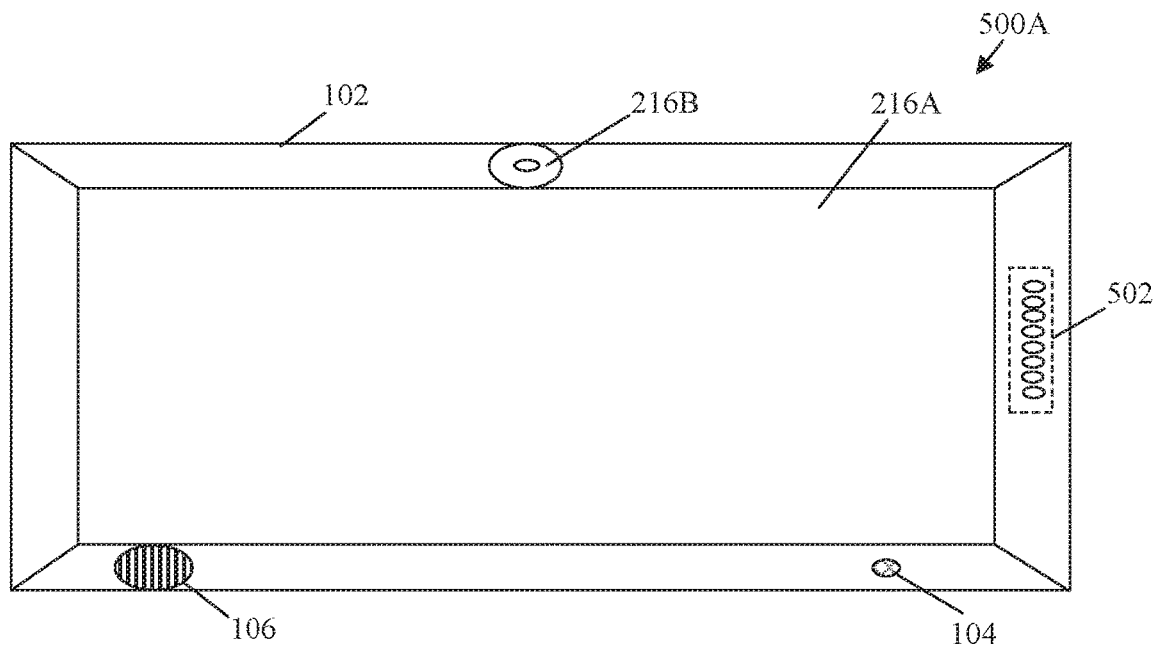
FIGS. 5A and 5B, collectively, illustrate an exemplary front-view and rear-view of the AV reproduction device of FIG. 2, in accordance with an embodiment of the disclosure.
Figure 5B:
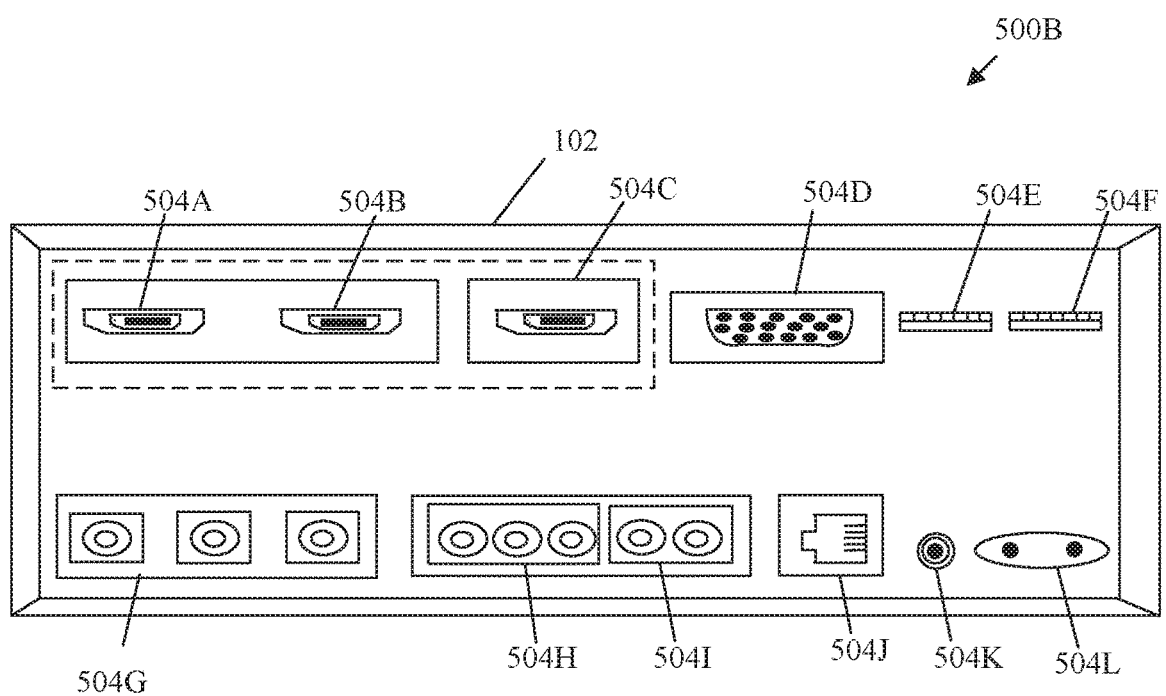

FIG. 5A and FIG. 5B, collectively, illustrates an exemplary front view and rear view of the AV reproduction device 102 of FIG. 2, in accordance with an embodiment of the disclosure. FIGS. 5A and 5B are explained in conjunction with elements from FIGS. 1, 2, 3A, 3B, 3C, 3D, 3E, and 4. With reference to the FIG. 5A, there is shown a front view 500A of the AV reproduction device 102. The front view 500A may indicate the speaker 106, the audio capturing device 104, the display screen 216A, the image capturing device 216B, and a control panel 502. The functions related to the speaker 106, the audio capturing device 104, the display screen 216A, the image capturing device 216B are described in detail, for example, in FIGS. 1, 2, 3A, 3B, 3C, 3D, 3E, 6, 7, 8A, 8B, and 8C. In accordance with an embodiment, the control panel 502 may include a plurality of buttons or switches which are configured to receive manual inputs from the user 120. The AV reproduction device 102 may be configured to control the one or more functions of the AV reproduction device 102 based on the received manual inputs. Examples of the one or more functions controlled based on the received manual inputs through the control panel 502 may include, but are not limited to, volume control, display characteristics control, power ON/OFF, channel selection, or content source selection.

With reference to FIG. 5B, there is shown a rear view 500B of the AV reproduction device 102. The rear view 500B may include a plurality of ports 504A to 504L. Examples of the plurality of ports 504A to 504L may include, but are not limited to, a High-Definition Multimedia Interface (HDMI) port, an HDMI Audio Return Channel (ARC) port, a Personal Computer input (PC IN) port, Universal Serial Bus (USB) port, composite audio-video port, a component video port, component audio port, an Ethernet port, a radio frequency (RF) port, or power input port. In accordance with an embodiment, the AV reproduction device 102 may be connected with the plurality of external devices 110A to 110N through the plurality of ports 504A to 504L of the AV reproduction device 102.

Figure 6:
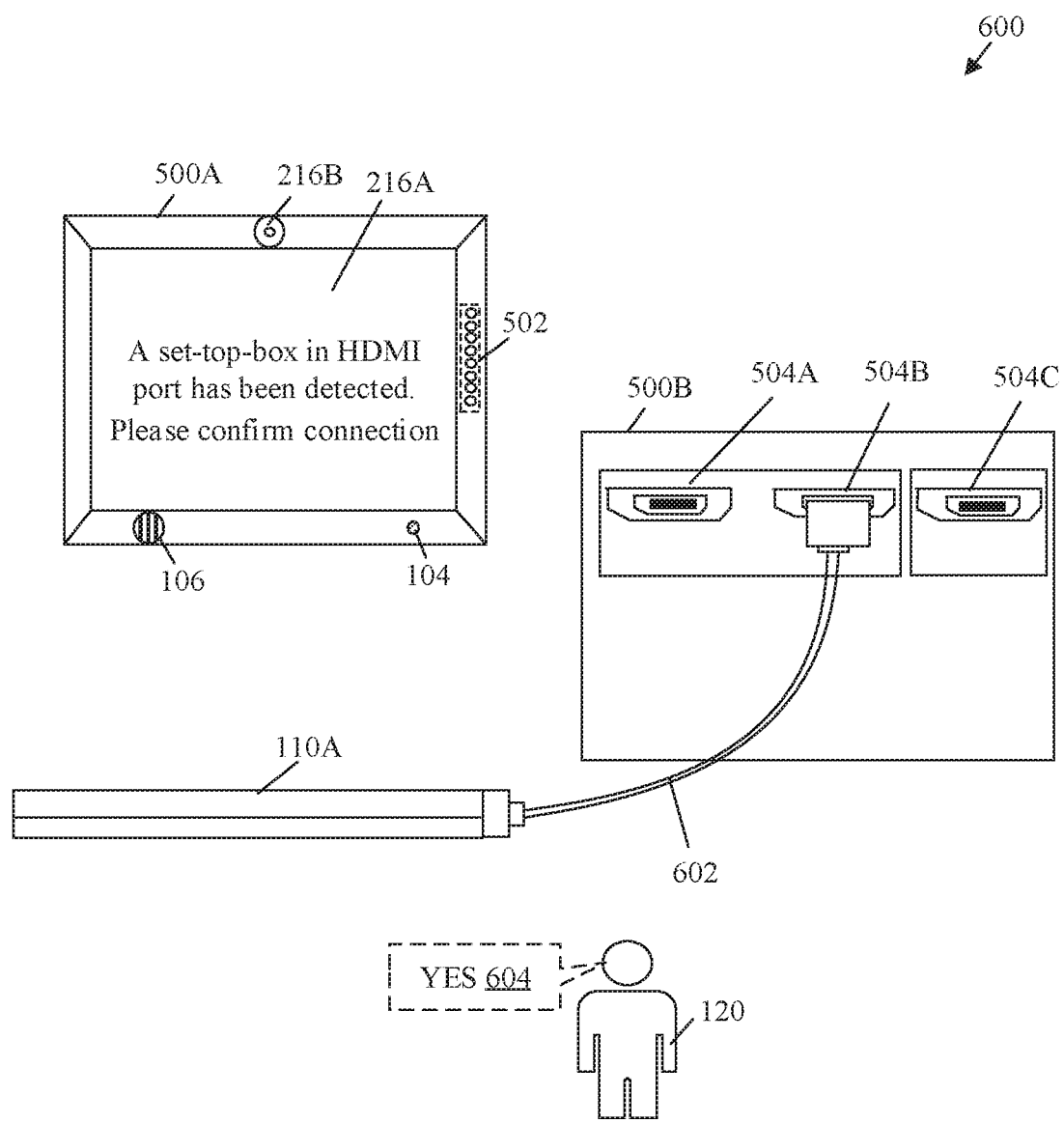
FIG. 6 illustrates a second exemplary scenario for first-time device setup of a hardware connection setting of the AV reproduction device of FIG. 2 using interview-based voice control, in accordance with an embodiment of the disclosure.

FIG. 6 illustrates a second exemplary scenario for first-time device setup of a hardware connection setting of the AV reproduction device of FIG. 2 using interview-based voice control, in accordance with an embodiment of the disclosure. FIG. 6 is explained in conjunction with elements from FIGS. 1, 2, 3A, 3B, 3C, 3D, 3E, 4, 5A, and 5B. With reference to FIG. 6, there is shown a second scenario 600.

In the second scenario 600, there is shown the front view 500A of the AV reproduction device 102, the rear view 500B of the AV reproduction device 102 and a first external device 110A of the plurality of external devices 110A to 110N connected to a first port 504B of the plurality of ports 504A to 504L via a cable 602 In accordance with an embodiment, the first port 504B may correspond to the HDMI port as shown in FIG. 6.

In accordance with an embodiment, the processor 204 may be configured to detect a first communication connection between the AV reproduction device 102 and the first external device 110A. The processor 204 may be further configured to receive the device identification information of the first external device 110A from the first external device 110A, based on the detection of the first communication connection. In accordance with an embodiment, the processor 204 may be further configured to retrieve, from the memory 214, the stored device identification information of the first external device 110A. In some embodiments, the processor 204 may be configured to retrieve the stored device identification information from the configuration server 116.

The processor 204 may be further configured to compare the received device identification information from the first external device 110A with the stored device identification information of the first external device 110A. In accordance with an embodiment, the processor 204 may be further configured to recognize the first external device 110A and/or confirm whether the detected first communication connection is correct based on the comparison of the received device identification information with the stored device identification information of the first external device 110A. The processor 204 may be further configured to output, via the speaker 106 and the display screen 216A, a first message (as a first user guidance instruction of the one or more user guidance instructions) based on the recognition. For example, the first external device 110A may be a set-top-box (STB) connected to the first port 504B (say HDMI port), and the first message may be "A set-top-box in HDMI port has been detected. Please confirm connection".

In accordance with an embodiment, the processor 204 may be configured to control the speaker 106 to output the first message (as audio output) for the user 120. The processor 204 may be further configured to control the audio capturing device 104 to receive a fifth user input 604 (as verbal input) from the user 120. The fifth user input 604 may indicate a confirmation (for example "Yes" or "Confirmed") from the user 120 in response to the first message output from the speaker 106 for the user 120. In accordance with an embodiment, the processor 204 may be further configured to compare the received fifth user input 604 with a condition (for example "Yes" or "Confirmed") associated with the first message and configure the hardware connection setting of the AV reproduction device 102 based on the comparison. Thus, the disclosed AV reproduction device 102 may enable the two-way audio communication with the user 120 and ensure accurate receipt of a verbal confirmation from the user 120 to configure hardware connections between the plurality of external devices 110A to 110N and the AV reproduction device 102. This may further enhance accuracy in the setup of the hardware connection setting of the AV reproduction device 102.

Figure 7:
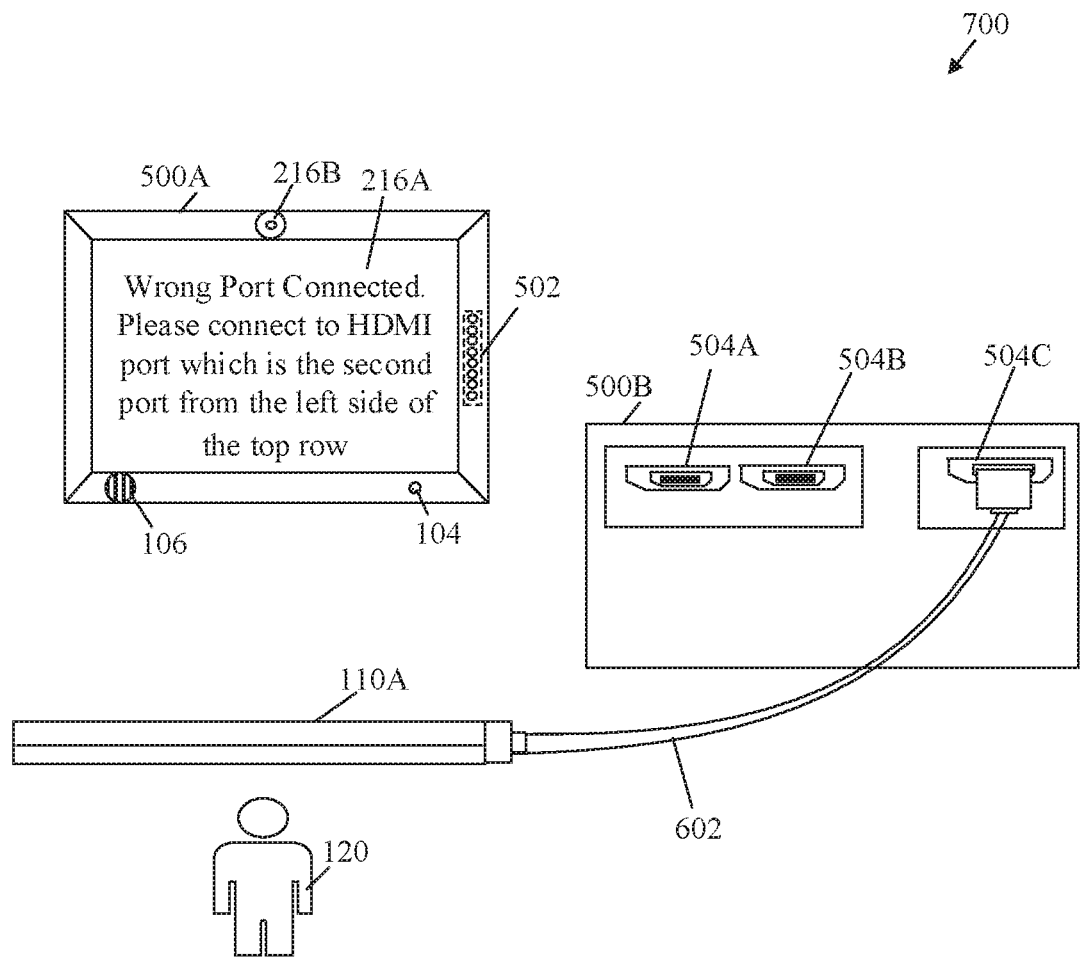
FIG. 7 illustrates a third exemplary scenario for first-time device setup of the hardware connection setting of the AV reproduction device of FIG. 2 using interview-based voice control, in accordance with an embodiment of the disclosure.

FIG. 7 illustrates a third exemplary operation for first-time device setup of the hardware connection setting of the AV reproduction device of FIG. 2 using interview-based voice control, in accordance with an embodiment of the disclosure. FIG. 7 is explained in conjunction with elements from FIGS. 1, 2, 3A, 3B, 3C, 3D, 3E, 4, 5A, 5B, and 6. With reference to FIG. 7, there is shown a third scenario 700.

In the third scenario 700, there is shown the front view 500A of the AV reproduction device 102, the rear view 500B of the AV reproduction device 102, and the first external device 110A connected to a second port 504C of the plurality of ports 504A to 504L via the cable 602. In accordance with an embodiment, the second port 504C may correspond to the HDMI ARC port as shown in FIG. 7.

In accordance with an embodiment, the processor 204 may be configured to detect a second communication connection between the AV reproduction device 102 and the first external device 110A, when the user 120 connects the first external device 110A at the second port 504C (HDMI ARC) of the AV reproduction device 102 via the cable 602. In accordance with an embodiment, the processor 204 may be further configured to determine whether the first external device 110A is compatible with the second port 504C (HDMI ARC). The processor 204 may be configured to determine whether the device identification information is received from the first external device 110A within a specific time period to determine the compatibility between the first external device 110A and the second port 504C (or the AV reproduction device 102). In some embodiments, the processor 204 may be configured to determine the compatibility between the first external device 110A and the second port 504C based on the comparison of the received device identification information of the first external device 110A and the stored device identification information of the first external device 110A. For example, in a case where the device identification information received from the first external device 110A does not match with the stored device identification information of the first external device 110A, the processor 204 may be configured to determine that the connected first external device 110A may be non-compatible with the second port 504C.

In accordance with an embodiment, if the second port 504C is non-compatible with the connected first external device 110A, the processor 204 may be further configured to determine that the user 120 may have attempted to connect the first external device 110A with the AV reproduction device 102 through a wrong port. In such case, the processor 204 may be configured to determine (or count) a number of attempts, the user 120 may have taken to setup the second communication connection between the AV reproduction device 102 and the first external device 110A through the second port 504C (i.e. determined as the wrong port for the first external device 110A). In accordance with an embodiment, the processor 204 may be configured to store the determined number of attempts in the user information (related to the user 120) in the memory 204.

In accordance with an embodiment, the processor 204 may be further configured to control to output, via the speaker 106 and the display screen 216A, a second message (as a second user guidance instruction of the one or more user guidance instructions) based on the determination that the second port 504C is non-compatible with the connected first external device 110A. For example, the first external device 110A may be a set-top-box (STB) connected to the second port 504BC (say HDMI ARC port), and the second message may be "Wrong Port Connected. Please connect to HDMI port which is the second port from the left side of the first row" as shown in FIG. 7.

In accordance with an embodiment, the second message may include information about a compatible port (for example, HDMI port) of the AV reproduction device 102 with the first external device 110A. The information about the compatible port may include, but is not limited to, a position of the compatible port on the rear view 500B, information about the first external device 110A, or information about a compatible cable (or the cable 602) to connect the first external device 110A with the compatible port (for example, HDMI port) of the AV reproduction device 102. Thus, the disclosed AV reproduction device 102 may automatically identify non-compatible hardware connections and may assist the user 120 to correctly connect the plurality of external devices 110A to 110N with the AV reproduction device 102. This may further ensure accurate first-time setup of the hardware connection setting of the AV reproduction device 102.

Figure 8A:
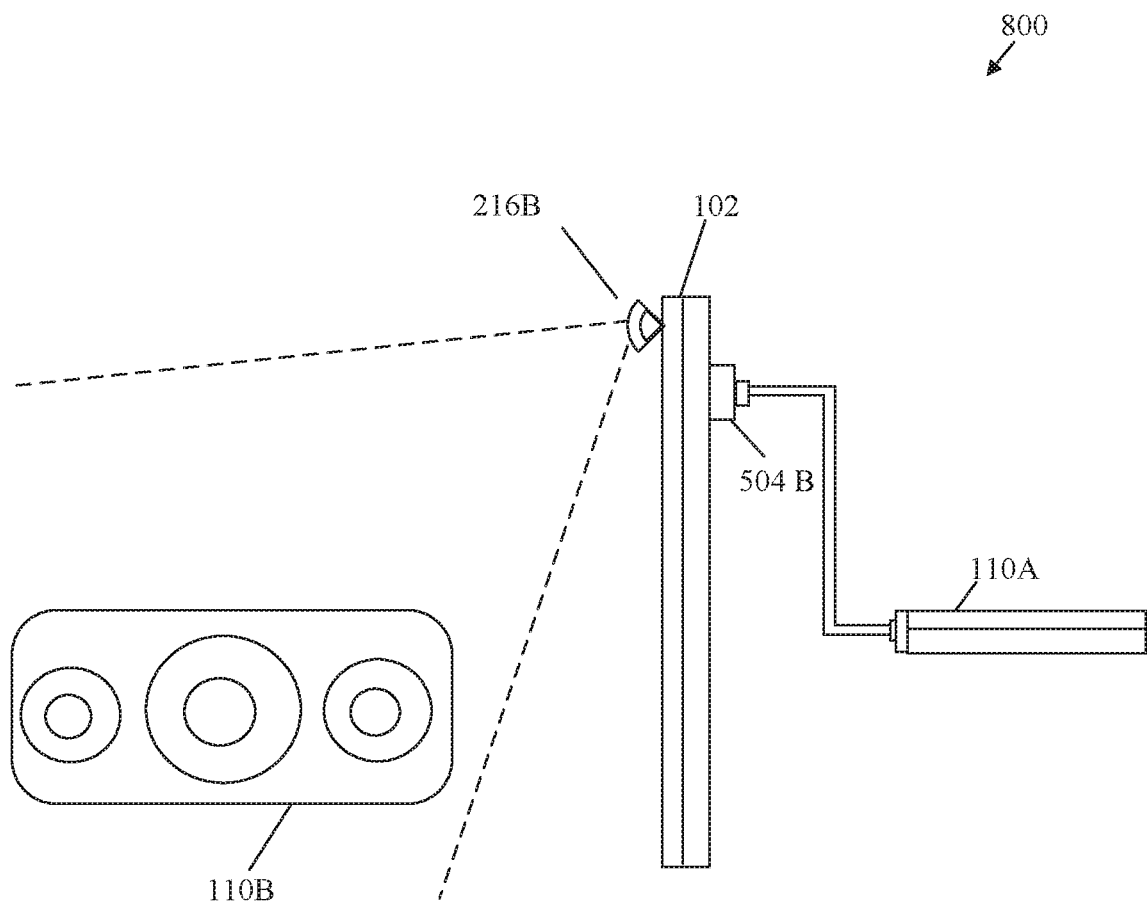
FIGS. 8A, 8B, and 8C, collectively, illustrate a fourth exemplary scenario for first-time device setup of the hardware connection setting of the AV reproduction device of FIG. 2 using interview-based voice control, in accordance with an embodiment of the disclosure.
Figure 8B:
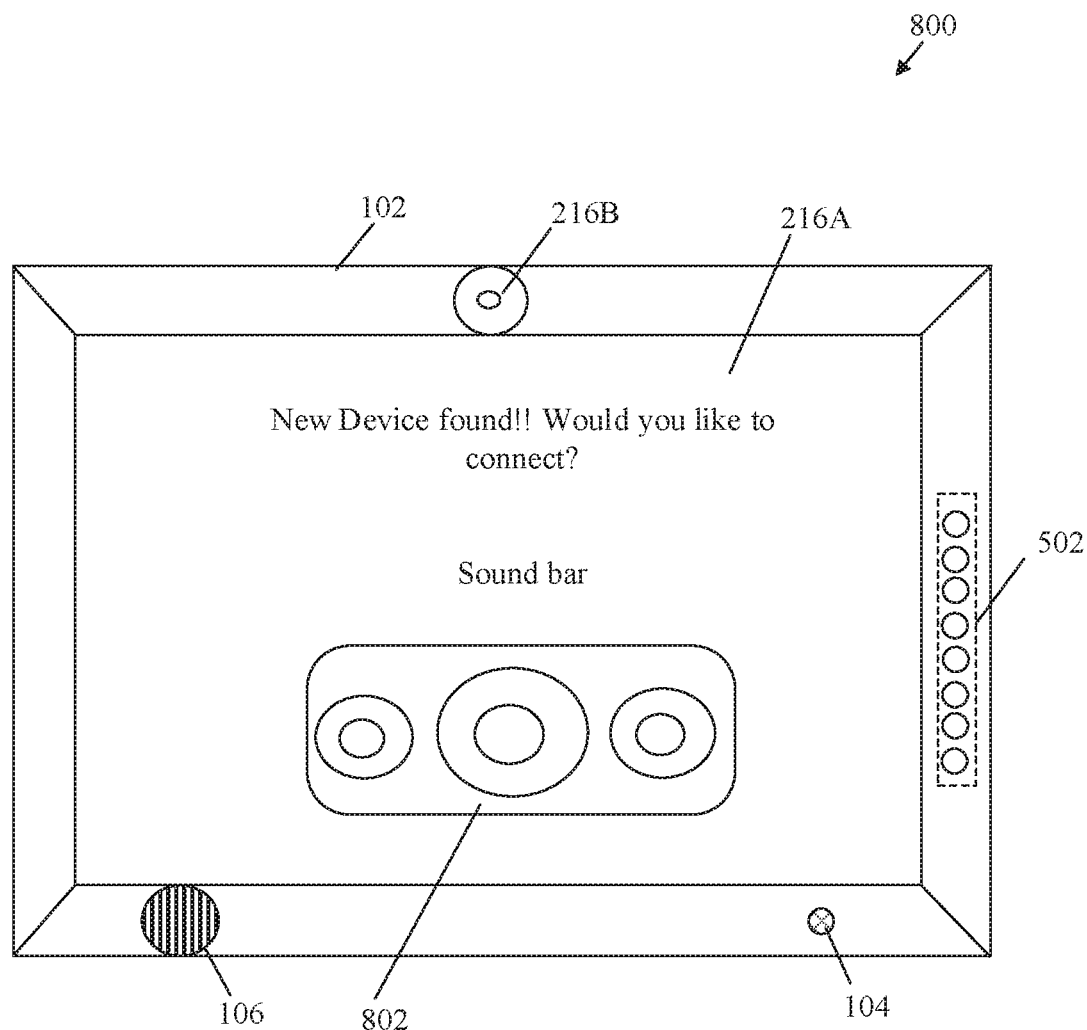
Figure 8C:
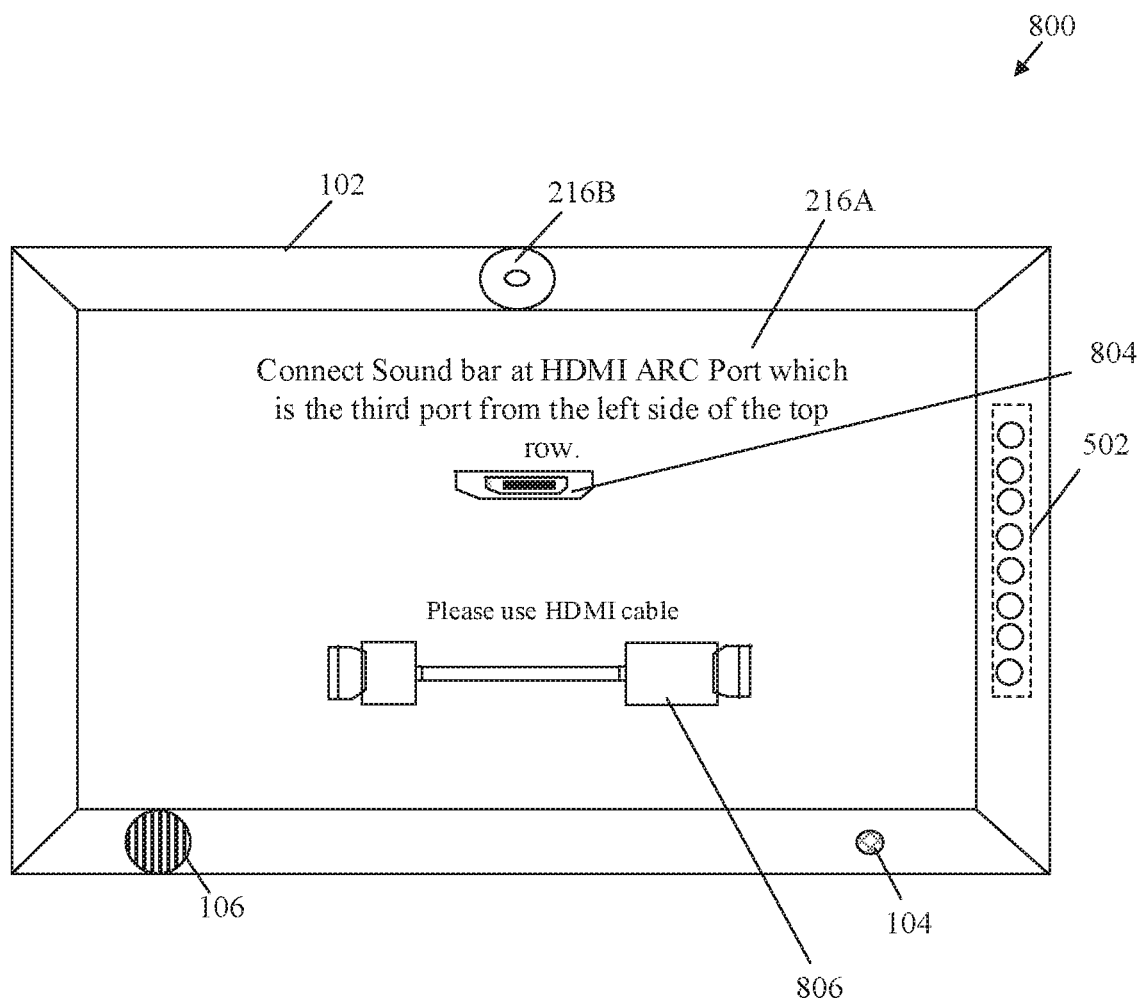

FIGS. 8A, 8B, and 8C, collectively, illustrate a fourth exemplary scenario for first-time device setup of the hardware connection setting of the AV reproduction device of FIG. 2 using interview-based voice control, in accordance with an embodiment of the disclosure. FIGS. 8A, 8B, and 8C are explained in conjunction with elements from FIGS. 1, 2, 3A, 3B, 3C, 3D, 3E, 4, 5A, 5B, 6, and 7. With reference to the FIG. 8A, there is shown a fourth scenario 800.

In the fourth scenario 800, there is shown a side view of the AV reproduction device 102, the first external device 110A connected to the first port 504B (as HDMI port) via the cable 602. There is further shown the image capturing device 216B and a second external device 110B of the plurality of external devices 110A to 110N. The second external device 110B may be in a field of view (FOV) of the image capturing device 216B.

In operations, the processor 204 may be configured to control the image capturing device 216B to capture an image of the second external device 110B. In accordance with an embodiment, the processor 204 may be further configured to retrieve the one or more sample images of the plurality of external devices 110A to 110N from the memory 214. In some embodiments, the processor 204 may be configured to retrieve the one or more sample images of the plurality of external devices 110A to 110N from the configuration server 116. The processor 204 may be further configured to compare the captured image of the second external device 110B with the retrieved one or more sample images of the plurality of external devices 110A to 110N. In accordance with an embodiment, the processor 204 may be further configured to identify or recognize the second external device 110B based on the comparison between the captured image of the second external device 110B with the one or more sample images of one of the plurality of external devices 110A to 110N.

In some embodiments, the processor 204 may be configured to capture a Quick Response (QR) code of the second external device 110B via the image capturing device 216B. The QR code may be displayed on an outer surface of the second external device 110B. In some embodiments, the processor 204 may be further configure to acquire the device identification information of the second external device 110B from the memory 204 or the configuration server 116 based on the captured QR code. In accordance with an embodiment, the processor 204 may be further configured to identify the second external device 110B based on the acquired device identification information of the second external device 110B. For example, the processor 204 may be configured to identify the second external device 110B as a sound bar (as shown in FIG. 8A) based on the comparison of the captured image and the one or more sample images or based on the acquired QR code on the outer surface of the second external device 110B.

With reference to FIG. 8B, there is shown the front view 500A of the AV reproduction device 102. In operations, the processor 204 may be further configured to control the speaker 106 and the display screen 216A to output a third message (as a third user guidance instruction of the one or more user guidance instructions) based on the identification of the second external device 110B. The processor 204 may be configured to control the speaker 106 to output the third message as the audio output for the user 120. For example, in case the second external device 110B is a new device for the AV reproduction device 102, the third message may be "New Device found!! Would you like to connect?" as shown in FIG. 8B. In accordance with an embodiment, the third message may include a name of the identified second external device 110B (for example sound bar). With respect to FIG. 8C, there is shown an image 802 of the identified second external device 110B.

In accordance with an embodiment, the processor 204 may be further configured to control the audio capturing device 104 to receive a sixth user input from the user 120 in response to the third message output via the speaker 106. The sixth user input may a verbal input (for example, "YES"). The processor 204 may be further configured to confirm the identification of the second external device 110B based on the received sixth user input (for example, "YES").

In accordance with an embodiment, the processor 204 may be further configured to retrieve a fourth message (as a fourth guidance instruction of the one or more user guidance instructions) from the memory 204 based on the confirmation of the identified second external device 110B. The processor 204 may be further configured to retrieve the fourth message to guide the user 120 to connect the identified second external device 110B with the AV reproduction device 102. In some embodiments, the processor 204 may be configured to retrieve the fourth message (as the fourth user guidance instruction) from the configuration server 116. In accordance with an embodiment, the processor 204 may be configure to identify a port (for example HDMI ARC port) from the plurality of ports 504A to 504L compatible or associated with the identified second external device 110B. In some embodiments, the fourth message retrieved from the memory 204 or the configuration server 116 may include information about a port which may be compatible or associated with the identified second external device 110B. The information about the compatible port may include, but is not limited to, a position of the compatible port on the rear view 500B. In some embodiments, the fourth message may include the information about the compatible cable to connect the second external device 110B with the compatible port (for example, HDMI ARC port) of the AV reproduction device 102. In some embodiments, the information about the compatible cable may include information about online websites or different local vendors from where the compatible cable may be purchased.

The processor 204 may be further configured to control the speaker 106 and the display screen 216A to output the fourth message for the user 120. With respect to FIG. 8C, there is shown the fourth message displayed on the display screen 216A. For example, fourth message may "Connect Sound bar at HDMI ARC Port which is the third port from the left side of the top row"), to setup the hardware connection settings between the second external device 110B and the AV reproduction device 102. With respect to FIG. 8C, there is also shown an image 804 of the compatible port (for example HDMI ARC port) associated with the identified second external device 110B (for example Sound bar) and an image 806 of the compatible cable to connect the identified second external device 110B with the compatible port of the AV reproduction device 102.

In accordance with an embodiment, in case the user 120 connects the second external device 110B with the AV reproduction device 102, the processor 204 may be further configured to confirm a third communication connection between the AV reproduction device 102 and the second external device 110B as described above in detail, for example, in FIG. 6. The processor 204 may further configure the hardware connection setting of the AV reproduction device 102 based on the third communication connection between the AV reproduction device 102 and the second external device 110B.

In accordance with an embodiment, the processor 204 may be further configured to capture an image of the user 120 via the image capturing device 216B. The processor 204 may be further configured to recognize the user 120 based on the captured image of the user 120. In some embodiments, the image recognition engine 210 may be configured to recognize the user 120 based on a comparison between the captured image of the user 120 and a sample image stored in the user information related to the user 120. In accordance with an embodiment, the processor 204 may be configured to output the one or more user guidance instructions (for example the second message, the third message, the fourth message) based on the recognized user 120. For example, in case the user 120 is an old person, the processor 204 may provide the one or more user guidance instructions with more detailed information or control the speaker 106 to output at higher volume or control the display screen 216A to display at a larger font size.

In accordance with an embodiment, the processor 204 may be further configured to determine one or more facial characteristics of the user 120 from the captured image via the image recognition engine 210. The one or more facial characteristics of the user 120 may indicate one or more motions or positions of muscles of a face of the user 120. The muscles of the face may move skin of the user 120, may create facial lines/folds, or may cause the movement of facial features, such as mouth, head, nose, eye, eyebrows of the user 120. In accordance with an embodiment, the processor 204 may be configured to determine a behavior state of the user 120 based on the determined facial characteristics of the user 120. Examples of the behavior state may include, but are not limited to, a happy behavior state, a sad behavior state, an angry behavior state, a calm behavior state, an irritated behavior state, a neutral behavior state, an excited behavior state, a confused behavior state, a stressed behavior state, a surprised behavior state, or a scared behavior state. In accordance with an embodiment, the processor 204 may be configured to output the one or more user guidance instructions (for example the second message, the third message, the fourth message) based on the determined behavior state of the user 120. For example, in case of determination of the confused behavior state of the user 120, the processor 204 may be configured to provide the detailed information to setup the hardware connection setting or to connect the plurality of external devices 110A to 110N with the AV reproduction device 102. The detailed information may include, but is not limited to, a voice based first-time setup tutorial, basic information about the plurality of ports 504A to 504L, the information about the online websites or different local vendors from where the compatible cable may be purchased, the multimedia content which indicate how to connect the plurality of external devices 110A to 110N to the AV reproduction device 102. In another example, in case of determination of the stressed behavior state of the user 120, the processor 204 may be configured to setup the plurality of configuration settings after the receipt of the audio confirmation from the user 120 for each of the plurality of configuration settings.

In accordance with an embodiment, the processor 204 may be further configured to retrieve past behavior information from the stored user information (related to the user 120) based on the recognized user 120. In some embodiments, the processor 204 may be configured to retrieve the past behavior information from the configuration server 116 based on the recognized user 120. In accordance with an embodiment, the past behavior information may include the number of attempts the user 120 may have taken in past to setup the second communication connection between the AV reproduction device 102 and the first external device 110A through the plurality of ports 504A to 504L as described in detail, for example, in FIG. 7. In accordance with an embodiment, the processor 204 may be configured to output the one or more user guidance instructions (for example the second message, the third message, the fourth message) based on the retrieved past behavior information. In some embodiments, the processor 204 may be configured to update existing one or more user guidance instructions based on the retrieved past behavior information of the recognized user 120. For example, in case the past behavior information indicates that the recognized user 120 may have failed multiple times (or the number of attempts exceeds a predefined threshold number) during the first-time setup of different AV reproduction device, the processor 204 may be configured to provide the detailed user guidance instructions to the user 120 to setup the hardware connection setting or to connect the plurality of external devices 110A to 110N with the AV reproduction device 102.

In accordance with an embodiment, the processor 204 may be configured to receive manufacture information from the identified second external device 110B (say as a new device) described in detail, for example, in FIG. 8A The processor 204 may be configured to receive the manufacture information from the identified second external device 110B when the second external device 110B is connected with the AV reproduction device 102. The processor 204 may be further configured to retrieve the manufacture information of the AV reproduction device 102 from the memory 214 or the configuration server 116 (or another server). The processor 204 may be further configured to compare the manufacture information of the second external device 110B with the manufacture information of the AV reproduction device 102. In accordance with an embodiment, the processor 204 may be further configured to automatically transmit the plurality of configuration settings of the AV reproduction device 102 to the second external device 110B, when the manufacture information of the second external device 110B matches with the manufacture information of the AV reproduction device 102. For example, in case both the identified second external device 110B (for example new sound bar) and the AV reproduction device 102 have same manufacture, then the processor 204 may be configured to retrieve the configured plurality of configuration settings of the AV reproduction device 102 from one of the memory 214 or the configuration server 116 and automatically transmit the retrieved plurality of configuration settings to the identified second external device 110B (for example sound bar) for a first-time device setup of the second external device 110B. Thus, the AV reproduction device 102 may enable the second external device 110B to automatically configure its configuration settings in case in case both the AV reproduction device 102 and the second external device belong to the same manufacture. Therefore, the AV reproduction device 102 may reduce the effort of the user 120 to manually setup the plurality of configuration settings associated with the second external device 110B (as a new device).

Figure 9:
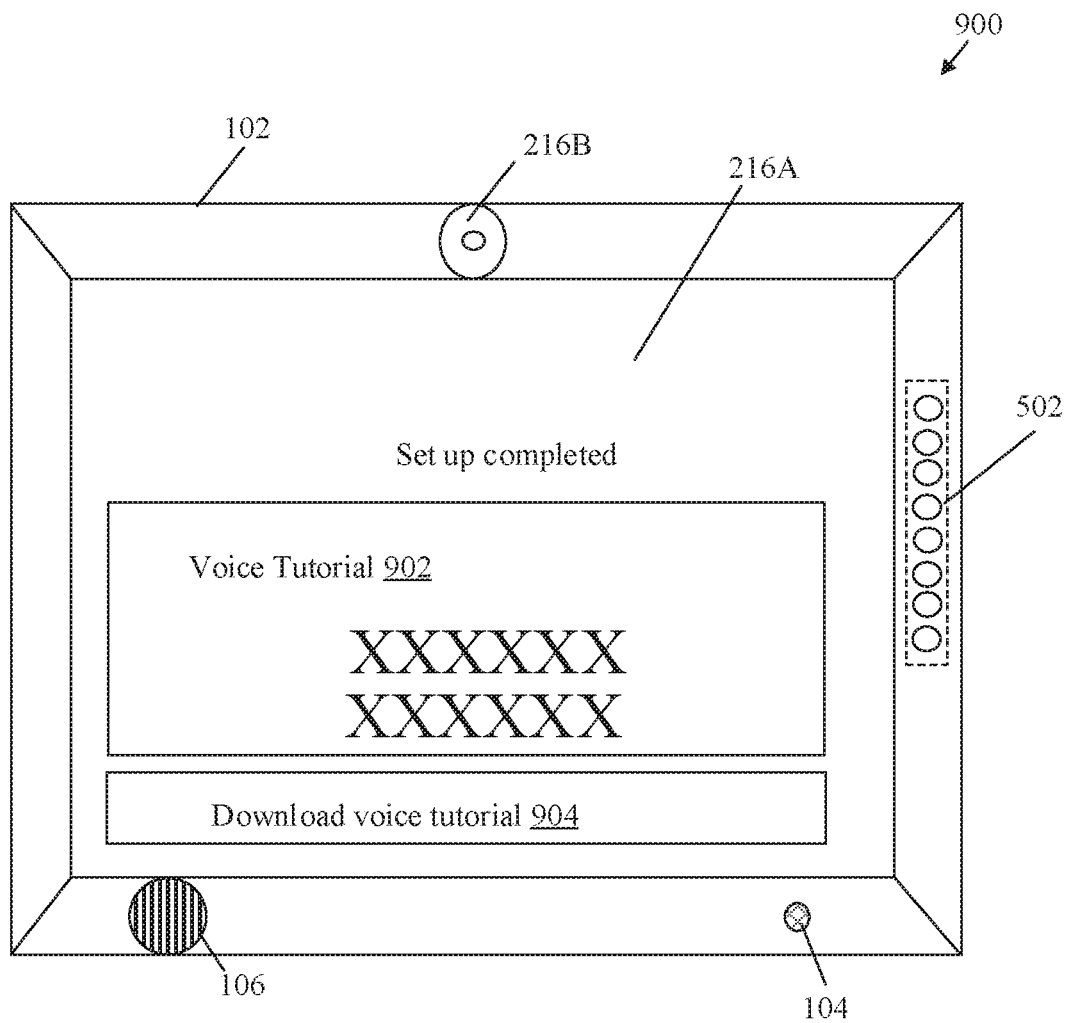
FIG. 9 illustrates an exemplary second user interface which indicates completion of first-time setup of the AV reproduction device of FIG. 2 using interview-based voice control, in accordance with an embodiment of the disclosure.

FIG. 9 illustrates an exemplary second user interface which indicates completion of first-time device setup of the AV reproduction device 102 of FIG. 2 using interview-based voice control, in accordance with an embodiment of the disclosure. FIG. 9 is explained in conjunction with elements from FIGS. 1, 2, 3A, 3B, 3C, 3D, 3E, 4, 5A, 5B, 6, 7, 8A, 8B, and 8C. With reference to the FIG. 9, there is shown a second user interface (UI) 900 displayed on the display screen 216A.

In accordance with an embodiment, the second UI 900 may display a completion of the first-time device setup of the AV reproduction device 102. The second UI 900 may include a first UI option 902. In accordance with an embodiment, the processor 204 may be configured to provide a voice tutorial to the user 120, through the speaker 106, based on a selection of the first UI option 902. In some embodiments, the processor 204 receive the selection of the first UI option 902 based on an audio input received from the user 120. The voice tutorial may include a plurality of audio instructions such as voice commands for the user 120 to operate the one or more functions of the AV reproduction device 102. In accordance with an embodiment, the voice tutorial may include the plurality of audio instructions to troubleshoot different hardware or software components of the AV reproduction device 102. In accordance with an embodiment, the processor 204 may be configured to retrieve the voice tutorial from the memory 204 or the configuration server 116.

In accordance with an embodiment, the second UI 900 may include a second UI option 904. In accordance with an embodiment, the processor 204 may be configured to transmit the voice tutorial to the user device 108 associated with the user 120 based on a selection of the second UI option 904. In some embodiments, the processor 204 receive the selection of the second UI option 904 based on the audio input received from the user 120. The second UI option 904 may allow the user 120 to download the voice tutorial from the AV reproduction device 102 to the user device 108. Therefore, the AV reproduction device 102 may enable control the one or more functions of the AV reproduction device, by the user 120, using the voice tutorial after the completion of the first-time device setup. Thus, the AV reproduction device 102 may assist a visually impaired user to configure the plurality of configuration settings and control the one or more functions of the AV reproduction device 102 based on the interview-based voice controlled setup and different accessibility features. This may further improve experience of the visually impaired user with the AV reproduction device 102.

Figure 10A:
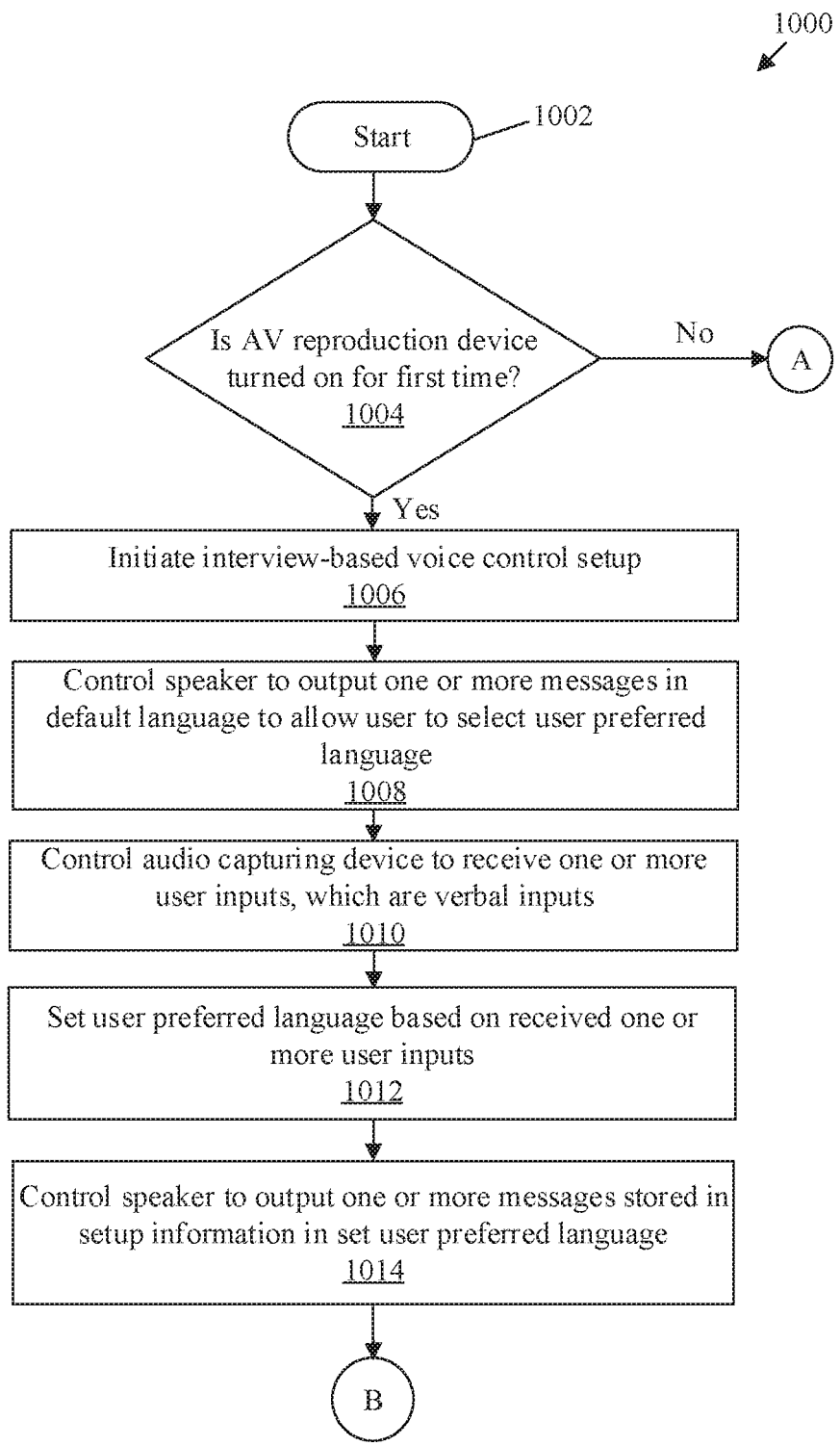
FIGS. 10A and 10B, collectively, depict a flow chart that illustrates an exemplary operations for first-time setup the AV reproduction device of FIG. 2 using interview-based voice control, in accordance with an embodiment of the disclosure.
Figure 10B:
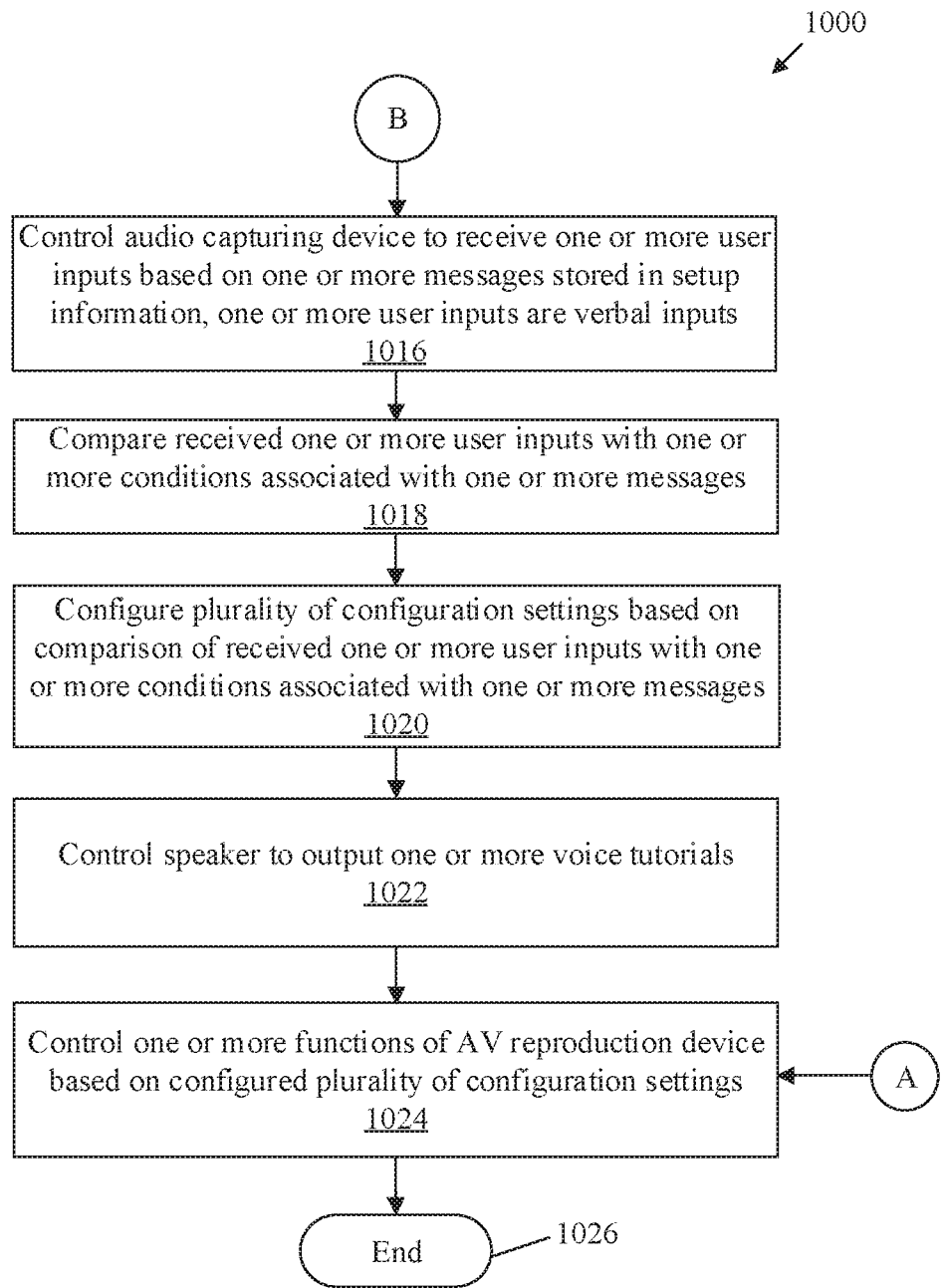

FIGS. 10A and 10B, collectively, depict a flow chart that illustrates an exemplary operations for first-time setup the AV reproduction device of FIG. 2 using interview-based voice control, in accordance with an embodiment of the disclosure. The flow chart 1000 may be described in conjunction with elements from FIGS. 1, 2, 3A, 3B, 3C, 3D, 3E, 4, 5A, 5B, 6, 7, 8A, 8B, 8C, and 9. With reference to FIG. 10, there is shown a flow chart 1000. The operations from 1002 to 1026 may be implemented in the AV reproduction device 102. The operations in the flow chart 1000 may stars at 1002 and proceeds to 1004.

At 1004, it may be determined whether the AV reproduction device 102 is turned on for the first time. The processor 204 may be configured to determine whether the AV reproduction device 102 is turned on for the first time. In accordance with an embodiment, the AV reproduction device 102 may be configured to store information in the memory 204, which indicates that the AV reproduction device 102 has been turned earlier also or the plurality of configuration settings are already configured and stored in the memory 214. In cases, where the AV reproduction device 102 is turned for the first time, control passes to 1006. Otherwise, control passes to 1024, where the one or more functions of AV reproduction device may be controlled.

At 1006, interview-based voice controlled setup may be initiated. In accordance with an embodiment, the processor 204 may be configured to initiate the interview-based voice controlled setup. The initialization of the interview-based voice controlled setup of the AV reproduction device 102 may be described in detail, for example, in FIGS. 3A and 3B.

At 1008, the speaker 106 may be controlled to output one or more messages in default language to allow the user 120 to select a user preferred language. In accordance with an embodiment, the processor 204 may be further configured to control the speaker 106 to output the one or more messages (as verbal output) in the default language, to allow the user 120 to select the user preferred language. The selection of the user preferred language may be described in detail, for example, in FIG. 3C.

At 1010, the audio capturing device 104 may be controlled to receive the one or more user inputs, which are verbal inputs. In accordance with an embodiment, the processor 204 may be configured to control the audio capturing device 104 to receive the one or more user inputs (as verbal input) to select the language preferred by the user 120. The interview-based voice controlled setup for the selection of the user preferred language may be described in detail, for example, in FIG. 3C.

At 1012, the user preferred language may be set based on the received one or more user inputs. In accordance with an embodiment, the processor 204 may be further configured to set the user preferred language in the interview-based voice controlled setup of the AV reproduction device 102 based on the received one or more user inputs.

At 1014, the speaker 106 may be controlled to output the one or more messages stored in the setup information in the set user preferred language. In accordance with an embodiment, the processor 204 may be configured to control the speaker 106 to output the one or more messages stored in the setup information.

At 1016, the audio capturing device 104 may controlled to receive the one or more user inputs based on the one or more messages stored in the setup information. The one or more user inputs are verbal inputs. In accordance with an embodiment, the processor 204 may be configured to control the audio capturing device 104 to receive the one or more user inputs from the user 120.

At 1018, the received one or more user inputs may be compared with the one or more conditions associated with the one or more messages. In accordance with an embodiment, the processor 204 may be configured to compare the received one or more user inputs with the one or more conditions associated with the one or more messages as described in detail, for example, in FIGS. 3B, 3C. and 3D.

At 1020, the plurality of configuration settings may be configured based on the comparison of the received one or more user inputs with the one or more conditions associated with the one or more messages. In accordance with an embodiment, the processor 204 may further configure the plurality of configuration settings based on the interview based voice controlled setup.

At 1022, the speaker 106 may be controlled to output one or more voice tutorials. In accordance with an embodiment, the processor 204 may be configured to control the speaker 106 to output the one or more voice tutorials to the user 120 based on the configured plurality of configuration settings. The process to output one or more voice tutorials may be described in detail, for example, in FIG. 9.

At 1024, the one or more functions of the AV reproduction device 102 may be controlled based on the configured plurality of configuration settings. The processor 204 may be configured to control the one or more functions of the AV reproduction device 102, based on the configured plurality of configuration settings. Examples of the one or more functions may be described in detail, for example, in FIG. 1. Control passes to end 1026.

Figure 11A:
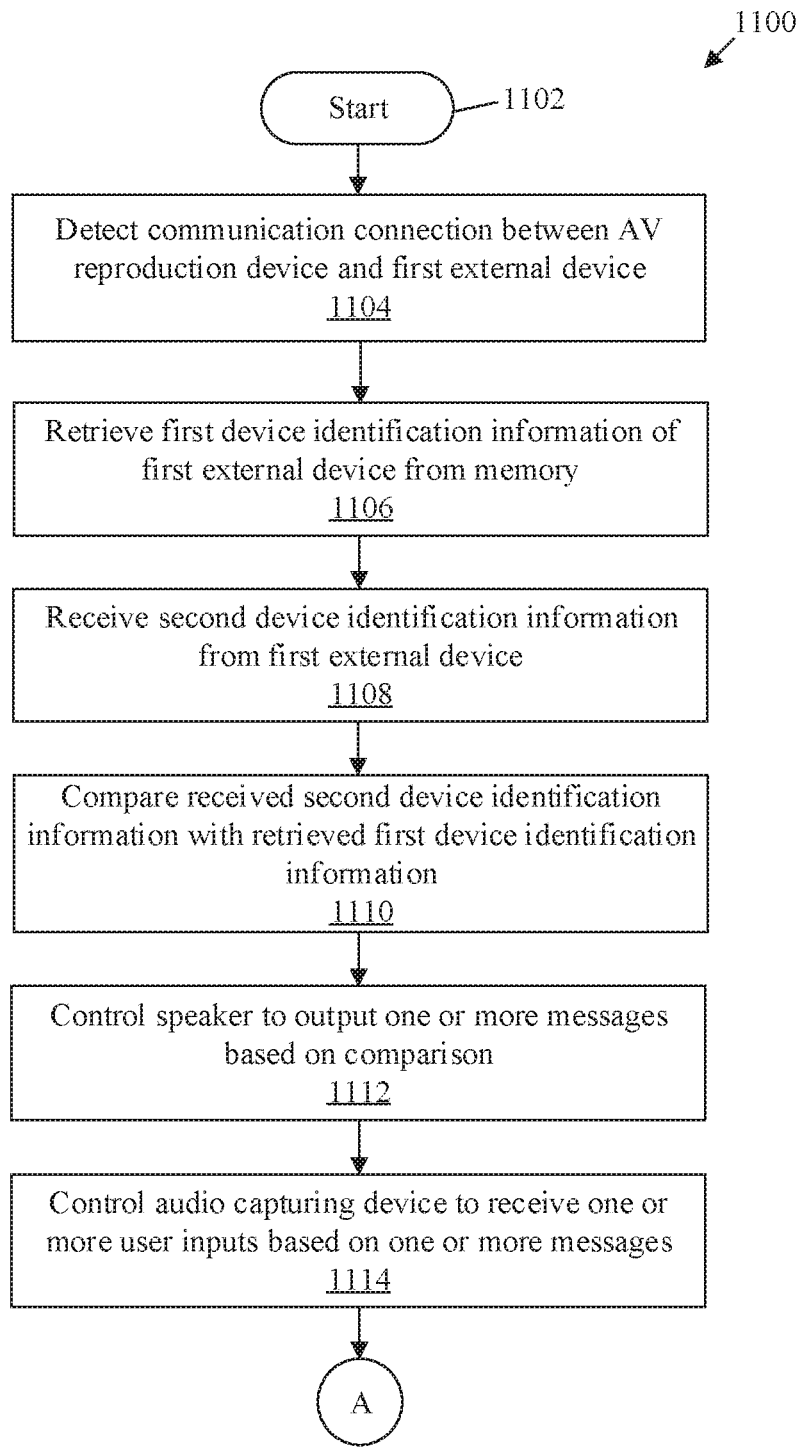
FIGS. 11A and 11B, collectively, depict a flow chart that illustrates an exemplary operations for first-time setup of the hardware connection setting of the AV reproduction device of FIG. 2, in accordance with an embodiment of the disclosure.
Figure 11B:
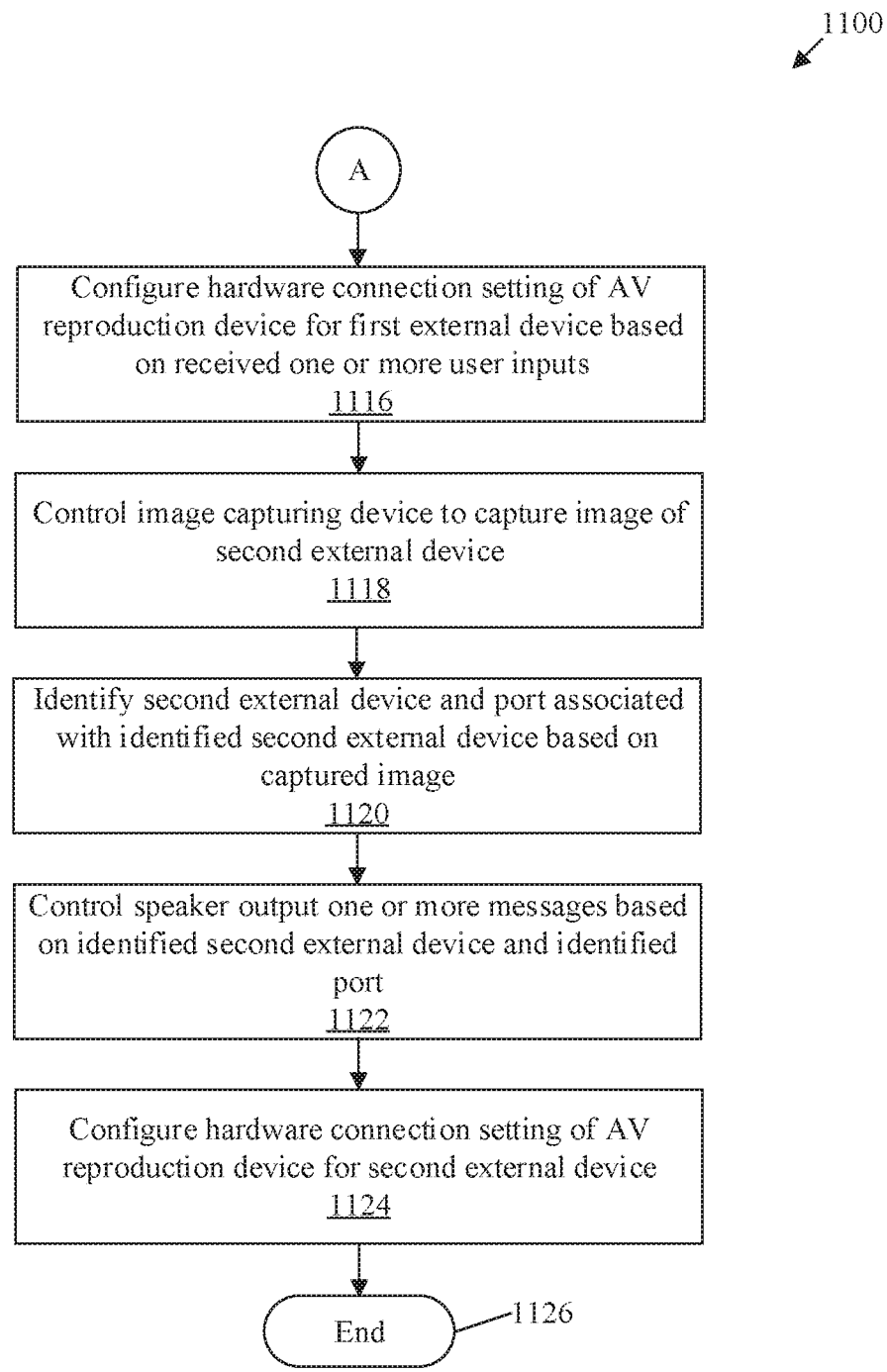

FIGS. 11A and 11B, collectively, depict a flow chart that illustrates an exemplary operations for first-time setup of hardware connection setting of the AV reproduction device of FIG. 2, in accordance with an embodiment of the disclosure. The flow chart 1100 may be described in conjunction with elements from FIGS. 1, 2, 3A, 3B, 3C, 3D, 3E, 4, 5A, 5B, 6, 7, 8A, 8B, 8C, and 9. With reference to FIG. 11, there is shown a flow chart 1100. The operations from 1102 to 1126 may be implemented in the AV reproduction device 102. The operations in the flow chart 1100 may stars at 1102 and proceeds to 1104.

At 1104, a communication connection between the AV reproduction device 102 and the first external device 110A may be detected. In accordance with an embodiment, the processor 204 may be configured to detect the communication connection between the AV reproduction device 102 and the first external device 110A, when the user 120 connects the first external device 110A with one of the plurality of ports 504A to 504L of the AV reproduction device 102 with a cable. The detection of the communication connection between the AV reproduction device 102 and the first external device 110A may be described in detail, for example, in FIGS. 6 and 7.

At 1106, first device identification information of the first external device 110A may be retrieved from the memory 214. In accordance with an embodiment, the processor 204 may be configured to retrieve the stored first device identification information of the first external device 110A from the memory 214.

At 1108, second device identification information may be received from the first external device 110A. In accordance with an embodiment, the processor 204 may be configured to receive the second device identification information of the first external device 110A from the first external device 110A.

At 1110, the received second device identification information may be compared with the retrieved first device identification information. In accordance with an embodiment, the processor 204 may be configured to compare the received second device identification information of the first external device 110A with the retrieved first device identification information of the first external devices 110A.

At 1112, the speaker 106 may be controlled to output the one or more user messages based on the comparison. In accordance with an embodiment, the processor 204 may be configured to control the speaker 106 to output the one or more messages based on the comparison. The one or more message (as the one or more user guidance instructions) output via the speaker 106 may be described in detail, for example, in FIGS. 6, 7, 8A, 8B, and 8C.

At 1114, the audio capturing device 104 may be controlled to receive the one or more user inputs based on the one or more messages. In accordance with an embodiment, the processor 204 may be configured to control the audio capturing device 104 to receive the one or more user inputs from the user 120 based on the one or more messages output via the speaker 106.

At 1116, the hardware connection setting of the AV reproduction device 102 may be configured for the first external device 110A based on the received one or more user inputs. In accordance with an embodiment, the processor 204 may be configured to set the hardware connection setting of the AV reproduction device for the first external device 110A as described in detail, for example, in FIGS. 6 and 7.

At 1118, the image capturing device 216B may be controlled to capture image of the second external device 110B. In accordance with an embodiment, the processor 204 may be configured to control the image capturing device 216B to capture the image of the second external device 110B.

At 1120, the second external device 110B and a port associated with the second external device 110B may be identified based on the captured image. In accordance with an embodiment, the processor 204 may be configured to identify the second external device 110B and the port, of the AV reproduction device 102, associated with the second external device 110B. The identification of the with the second external device 110B may be described, in detail, for example, in FIG. 8A.

At 1122, the speaker 106 may be controlled to output the one or more messages based on the identified second external device and the identified port. In accordance with an embodiment, the processor 204 may be configured to control the speaker 106 to output the one or more messages (as user guidance instructions) based on the identified second external device and the identified port of the AV reproduction device 102 as described in detail, for example, in FIGS. 8B and 8C.

At 1124, the hardware connection setting of the AV reproduction device 102 may be configured for the second external device 110B. In accordance with an embodiment, the processor 204 may further configure the hardware connection setting of the AV reproduction device 102 for the second external device 110B as described in detail, for example, in FIG. 8C. Control passes to end 1126.

Exemplary aspects of the disclosure may include an AV reproduction device (such as the AV reproduction device 102 of FIG. 1). The AV reproduction device 102 may include at least one audio capturing device (such as the audio capturing device 104 of FIG. 1), at least one speaker (such as the speaker 106 of FIG. 1), a memory (such as the memory 214 of FIG. 2) configured to store setup information associated with a first-time device setup of the AV reproduction device 102. The first-time device setup may be associated with a plurality of configuration settings of the AV reproduction device 102. The AV reproduction device 102 may further include circuitry (such as the circuitry 202 of FIG. 2), coupled to the memory 214, configured to control the at least one speaker 106 to output a message in the setup information. The circuitry 202 may be further configured to control the at least one audio capturing device 104 to receive a user input based on the message. The user input may be a verbal input. The circuitry 202 may be configured to compare the received user input with at least one condition associated with the message. The circuitry 202 may further configure a configuration setting from the plurality of configuration settings, based on the comparison of the received user input with the at least one condition associated with the message. The circuitry 202 may be further configured to control at least a function of the AV reproduction device 102 based on the configured configuration setting.

In accordance with an embodiment, the plurality of configuration settings of the AV reproduction device may comprise at least one of a user language setting, a network setting, a user identification (ID) setting, a display setting, an audio setting, a hardware connection setting, a security and privacy setting, or an accessibility setting.

In accordance with an embodiment, the AV reproduction device 102 may further include a plurality of ports (such as the plurality of ports 504A to 504L) on a surface of the AV reproduction device 102. In accordance with an embodiment, the hardware connection setting may indicate communication connections between the plurality of ports 504A to 504L and a plurality of external devices (such as the plurality of external devices 110A to 110N). In accordance with an embodiment, the plurality of ports 504A to 504L may comprise at least one of: at least one High-Definition Multimedia Interface (HDMI) port, an HDMI-Audio Return Channel (ARC) port, a personal computer input (PC IN) port, at least one Universal Serial Bus (USB) port, a composite audio-video port, a component video port, a component audio port, a radio frequency (RF) port, an Ethernet port, or a power input port. In accordance with an embodiment, the plurality of external devices 110A to 110N may include at least one of an Audio/Video (AV) system, a sound bar, an audio reproduction device, a set-top box (STB), a mobile phone, an imaging device, or a gaming console.

In accordance with an embodiment, the memory 214 may be configured to store first device identification information of each of the plurality of external devices 110A to 110N corresponding to each of the plurality of ports 504A to 504L. The circuitry 202 may be configured to detect the communication connection between one of a first port (such as the first port 504B of FIG. 6) of the plurality of ports 504A to 504L and at least one external device (such as the first external device 110A of FIG. 6) of the plurality of external devices 110A to 110N. The circuitry 202 may be configured to receive second device identification information of the at least one external device 110A based on the detection of the communication connection. The circuitry 202 may be configured to compare the received second device identification information with the stored first device identification information. The circuitry 202 may be configured to control the at least one speaker 106 to output a first user guidance instruction, as the message, based on the comparison of the stored first device identification information and the received second device identification information. The circuitry 202 may be further configured to control the at least one audio capturing device 104 to receive the user input based on the first user guidance instruction, and configure the hardware connection setting of the AV reproduction device 102 based on the received user input.

In accordance with an embodiment, the first user guidance instruction may indicate a request for confirmation of the communication connection between the first port 504B and the at least one external device 110A. The circuitry 202 may be further configured to control the audio capturing device 104 to receive the user input as the confirmation of the connection between the first port 504B and the at least one external device 110A.

In accordance with an embodiment, the circuitry 202 may be configured to detect that the first port (such as 504C of FIG. 7) is compatible with the at least one external device 110A. The circuitry 202 may be further configured to control the least one speaker 106 to output a second user guidance instruction based on the detection that the first port 504C is non-compatible with the at least one external device 110A. The second user guidance instruction may indicate a second port (such as 504B of FIG. 7) of the plurality of ports to establish the connection between the second port and the at least one external device. The second guidance instruction may further indicate at least one of a position of the second port 504B on the surface of the AV reproduction device 102, information about the at least one external device 110A, or information about the connection between the second port 504B and the at least one external device 110A.

In accordance with an embodiment, the circuitry 202 may be configured to receive, from one (such as the user device 108 of FIG. 1) of the plurality of external devices 110A to 110N, the user input related to the message. The one of the plurality of external devices 110A to 110N may receive the user input as the verbal input. The circuitry 202 may be configured to convert the verbal input into first text information, and compare the first text information with the at least one condition associated with the message. The circuitry 202 may further configure to configure the configuration setting based on the comparison of the first text information with the at least one condition associated with the message.

In accordance with an embodiment, the circuitry 202 may be configured to control the at least one speaker 106 to output the message in a default language set in the AV reproduction device 102. The message in the default language may be is to set a language preferred by a user (such as the user 120 of FIG. 1). The circuitry 202 may be configured to control the at least one audio capturing device 104 to receive the user input which indicates the language preferred by the user 120, and configure a user language setting, as the configuration setting, based on the received user input. The circuitry 202 may be further configured to control the AV reproduction device 102 based on the configured user language setting.

In accordance with an embodiment, the AV reproduction device 102 may further include an image capturing device (such as the image capturing device 216B of FIG. 2) and a display screen (such as the display screen 216A of FIG. 2). The memory 214 may be configured to store one or more sample images of the plurality of external devices 110A to 110N and the plurality of ports 504A to 504L. The circuitry 202 may be further configured to control the image capturing device 216B to capture a first image of at least one external device (such as the second external device 110B) of the plurality of external devices 110A to 110N. The circuitry 202 may be configured to identify, the at least one external device 110B and at least one (such as the second port 504C of FIG. 7) of the plurality of ports 504A to 504L associated with the identified at least one external device 110B, based on the captured first image and the stored one or more sample images of the plurality of external devices 110A to 110N. The circuitry 202 may be configured to control, one of the at least one speaker 106 or the display screen 216A, to output at least one user guidance instruction based on the identified at least one external device 110B and the identified at least one of the plurality of ports 504A to 504L. The at least one user guidance instruction may indicate first information to connect the identified at least one external device 110B to the identified at least one of the plurality of ports 504A to 504L. In accordance with an embodiment, the at least one user guidance instruction may further indicate second information of at least one cable (such as the cable 602 of FIGS. 6 and 7) to connect the identified at least one external device 110B to the identified at least one of the plurality of ports 504A to 504L.

In accordance with an embodiment, the circuitry 202 may be configured to control the image capturing device 216B to capture a second image of the user 120 associated with the AV reproduction device 120, and recognize the user 120 based on the captured second image. The circuitry may be further configured to control one of the at least one speaker 106 or the display screen 216A, to output the at least one user guidance instruction based on the recognized user 120.

In accordance with an embodiment, the circuitry 202 may be further configured to determine past behavior information of the user 120 based on the captured second image of the user 120. The circuitry 202 may be configured to update the at least one user guidance instruction based on the determined past behavior information of the user 120. The circuitry 202 may be configured to determine facial characteristics of the user 120 from the captured second image of the user 120, determine a behavior state based on the determined facial characteristics of the user, and control, one of the at least one speaker 106 or the display screen 216A, to output the at least one user guidance instruction based on the determined behavior state.

In accordance with an embodiment, the memory 214 may be configured to store first manufacture information of the AV reproduction device 102. The circuitry 202 may be configured to retrieve the first manufacture information from the memory 214, and receive second manufacture information of the identified at least one external device 110B from a server (such as the configuration server 116). The circuitry 202 may be further configured to compare the retrieved first manufacture information and the received second manufacture information. The circuitry 202 may be further configured to transmit the configured configuration setting to the identified at least one external device 110B based on the comparison of the retrieved first manufacture information and the received second manufacture information.

In accordance with an embodiment, the circuitry 202 may be configured to control one of the display screen 216A or the at least one speaker 106 to output a plurality of messages in the setup information. The circuitry 202 may be further configured to control the at least one audio capturing device 104 to receive the user input for each of the output plurality of messages. The circuitry 202 may further configure the plurality of configuration settings based on the received user input for each of the plurality of messages. In accordance with an embodiment, the circuitry 202 may be configured to control one of the display screen 216A or the at least one speaker 106 to output an audio tutorial to the user 120 based on the plurality of configuration settings of the AV reproduction device 102. The user 120 may be a visually impaired user. The audio tutorial may include a plurality of audio instructions for the user 120 to control the AV reproduction device 120.

Exemplary aspects of the disclosure may include a user device (such as the user device 108 of FIG. 1). The user device 108 may include at least one audio capturing device (such as the audio capturing device 304 of FIG. 3A), at least one speaker (such as the speaker 306 of FIG. 3A), a memory configured to store setup information associated with a first-time device setup of the AV reproduction device 102. The first-time device setup may be associated with a plurality of configuration settings of the AV reproduction device 102. The user device 108 may further include circuitry, coupled to the memory, configured to control the at least one speaker 306 to output a message in the setup information. The circuitry may be further configured to control the at least one audio capturing device 304 to receive a user input based on the message. The user input may be a verbal input. The circuitry may be configured to compare the received user input with at least one condition associated with the message. The circuitry may be further configured to transmit, to the AV reproduction device 102, information associated with a configuration setting from the plurality of configuration settings, based on the comparison of the received user input with the at least one condition associated with the message.

In accordance with an embodiment, the circuitry may be further configured to control the at least one speaker 306 to output a user guidance instruction, and wherein the user guidance instruction is associated with an unboxing operation of the AV reproduction device 102.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for an audio-video (AV) reproduction device setup using interview-based voice control. The AV reproduction device may include at least one speaker, at least one audio capturing device, and a memory. The at least one code section may cause the machine and/or computer to perform the steps that comprise storage of setup information associated with a first-time device setup of the AV reproduction device in the memory. The first-time device setup may be associated with a plurality of configuration settings of the AV reproduction device. A message in the setup information may be output via the at least one speaker. Further, a user input based on the message may be received via the at least one audio capturing device. The user input may be a verbal input. Further, the received user input may be compared with at least one condition associated with the message. A configuration setting from the plurality of configuration settings may be configured based on the comparison of the received user input with the at least one condition associated with the message. Further, at least a function of the AV reproduction device may be controlled based on the configured configuration setting.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. An audio-video (AV) reproduction device, comprising:
   at least one audio capturing device;
   at least one speaker;
   a plurality of ports on a surface of the AV reproduction device;
   a memory configured to:
   store setup information associated with a first-time device setup of the AV reproduction device, and store first device identification information of each of a plurality of external devices corresponding to each of the plurality of ports, wherein
the first-time device setup is associated with a plurality of configuration settings of the AV reproduction device,
the plurality of configuration settings comprises a hardware connection setting, and
the hardware connection setting indicates connections between the plurality of ports and the plurality of external devices; and
circuitry, coupled to the memory, wherein the circuitry is configured to:
detect a connection between a first port of the plurality of ports and at least one external device of the plurality of external devices;
receive second device identification information from the at least one external device based on the detection of the connection;
compare the received second device identification information with the stored first device identification information;
control the at least one speaker to output, as a message, a first user guidance instruction in the setup information, wherein the at least one speaker is controlled based on the comparison of the stored first device identification information and the received second device identification information;
control the at least one audio capturing device to receive a user input based on the message, wherein the user input is a verbal input;
compare the received user input with at least one condition associated with the message;
configure a configuration setting from the plurality of configuration settings, based on the comparison of the received user input with the at least one condition associated with the message; and
control at least a function of the AV reproduction device based on the configured configuration setting.

2. The AV reproduction device according to claim 1, wherein the plurality of configuration settings of the AV reproduction device further comprises at least one of a user language setting, a network setting, a user identification (ID) setting, a display setting, an audio setting, a security and privacy setting, or an accessibility setting.

3. The AV reproduction device according to claim 1, wherein the plurality of ports comprises at least one of: at least one High-Definition Multimedia Interface (HDMI) port, an HDMI-Audio Return Channel (ARC) port, a personal computer input (PC IN) port, at least one Universal Serial Bus (USB) port, a composite audio-video port, a component video port, a component audio port, a radio frequency (RF) port, an Ethernet port, or a power input port.

4. The AV reproduction device according to claim 1, wherein the plurality of external devices includes at least one of an Audio-Video (AV) receiver, an audio reproduction device, a sound bar, a set-top box (STB), a mobile phone, an imaging device, or a gaming console.

5. The AV reproduction device according to claim 1, wherein
the first user guidance instruction indicates a request for confirmation of the connection between the first port and the at least one external device, and
the circuitry is further configured to control the at least one audio capturing device to receive the user input as the confirmation of the connection between the first port and the at least one external device.

6. The AV reproduction device according to claim 1, wherein the circuitry is further configured to:
detect that the first port is compatible with the at least one external device; and
control, the at least one speaker, to output a second user guidance instruction based on the detection that the first port is non-compatible with the at least one external device, wherein
the second user guidance instruction indicates a second port, of the plurality of ports, to establish the connection between the second port and the at least one external device, and
the second user guidance instruction further indicates at least one of a position of the second port on the surface of the AV reproduction device, information about the at least one external device, or information about the connection between the second port and the at least one external device.

7. The AV reproduction device according to claim 1, wherein
the circuitry is further configured to receive, from one of the plurality of external devices, the user input related to the message, and
the one of the plurality of external devices receives the user input as the verbal input.

8. The AV reproduction device according to claim 1, wherein the circuitry is further configured to:
convert the verbal input into first text information;
compare the first text information with the at least one condition associated with the message; and
configure the configuration setting based on the comparison of the first text information with the at least one condition associated with the message.

9. The AV reproduction device according to claim 1, wherein the circuitry is further configured to:
control the at least one speaker to output the message in a default language set in the AV reproduction device, wherein the message in the default language is to set a language preferred by a user;
control the at least one audio capturing device to receive the user input which indicates the language preferred by the user;
configure a user language setting, as the configuration setting, based on the received user input; and
control at least the function of the AV reproduction device based on the configured user language setting.

10. The AV reproduction device according to claim 1, further comprising:
an image capturing device; and
a display screen, wherein
the memory is further configured to store one or more sample images of the plurality of external devices, and
the circuitry is further configured to:
control the image capturing device to capture a first image of at least one external device of the plurality of external devices;
identify, the at least one external device and at least one of the plurality of ports associated with the identified at least one external device, based on the captured first image and the stored one or more sample images of the plurality of external devices; and
control, one of the at least one speaker or the display screen, to output at least one user guidance instruction based on the identified at least one external device and the identified at least one of the plurality of ports, wherein the at least one user guidance instruction indicates first information to connect the identified at least one external device to the identified at least one of the plurality of ports.

11. The AV reproduction device according to claim 10, wherein the at least one user guidance instruction further indicates second information of at least one cable to connect the identified at least one external device to the identified at least one of the plurality of ports.

12. The AV reproduction device according to claim 10, the circuitry is further configured to:
   control the image capturing device to capture a second image of a user associated with the AV reproduction device;
   recognize the user based on the captured second image; and
   control, one of the at least one speaker or the display screen, to output the at least one user guidance instruction based on the recognized user.

13. The AV reproduction device according to claim 12, wherein the circuitry is further configured to:
   determine past behavior information of the user based on the captured second image of the user; and
   update the at least one user guidance instruction based on the determined past behavior information of the user.

14. The AV reproduction device according to claim 13, the circuitry is further configured to:
   determine facial characteristics of the user from the captured second image of the user;
   determine a behavior state of the user based on the determined facial characteristics of the user; and
   control, one of the at least one speaker or the display screen, to output the at least one user guidance instruction based on the determined behavior state.

15. The AV reproduction device according to claim 10, wherein
   the memory is further configured to store first manufacture information of the AV reproduction device, and
   the circuitry is further configured to:
      retrieve the first manufacture information from the memory;
      receive second manufacture information of the identified at least one external device from a server;
      compare the retrieved first manufacture information and the received second manufacture information; and
      transmit the configured configuration setting to the identified at least one external device based on the comparison of the retrieved first manufacture information and the received second manufacture information.

16. The AV reproduction device according to claim 1, wherein the circuitry is further configured to:
   control the at least one speaker to output a plurality of messages in the setup information;
   control the at least one audio capturing device to receive the user input for each of the output plurality of messages; and
   control the AV reproduction device to configure the plurality of configuration settings based on the received user input for each of the output plurality of messages.

17. The AV reproduction device according to claim 16, further comprising a display screen, wherein
   the circuitry is further configured to control one of the display screen or the at least one speaker to output an audio tutorial to a user based on the plurality of configuration settings of the AV reproduction device, the user is a visually impaired user, and the audio tutorial includes a plurality of audio instructions for the user to control the AV reproduction device.

18. A method, comprising:
   in an audio-video (AV) reproduction device which comprises at least one speaker, at least one audio capturing device, a plurality of ports on a surface of the AV reproduction device, and a memory:
   storing, in the memory, setup information associated with a first-time device setup of the AV reproduction device;
   storing, in the memory, first device identification information of each of a plurality of external devices corresponding to each of the plurality of ports, wherein
      the first-time device setup is associated with a plurality of configuration settings of the AV reproduction device,
      the plurality of configuration settings comprises a hardware connection setting, and
      the hardware connection setting indicates connections between the plurality of ports and the plurality of external devices;
   detecting a connection between a port of the plurality of ports and at least one external device of the plurality of external devices;
   receiving second device identification information from the at least one external device based on the detection of the connection;
   comparing the received second device identification information with the stored first device identification information;
   outputting, via the at least one speaker, a message in the setup information based on the comparison of the stored first device identification information and the received second device identification information;
   receiving, via the at least one audio capturing device, a user input based on the message, wherein the user input is a verbal input;
   comparing the received user input with at least one condition associated with the message;
   configuring a configuration setting from the plurality of configuration settings, based on the comparison of the received user input with the at least one condition associated with the message; and
   controlling at least a function of the AV reproduction device based on the configured configuration setting.

19. A user device, comprising:
   at least one audio capturing device;
   at least one speaker;
   a plurality of ports on a surface of an audio-video (AV) reproduction device;
   a memory configured to:
      store setup information associated with first-time device setup of the AV reproduction device, and
      store first device identification information of each of a plurality of external devices corresponding to each of the plurality of ports, wherein
         the first-time device setup is associated with a plurality of configuration settings of the AV reproduction device,
         the plurality of configuration settings comprises a hardware connection setting, and
         the hardware connection setting indicates connections between the plurality of ports and the plurality of external devices; and
   circuitry, coupled to the memory, configured to:
      detect a connection between a port of the plurality of ports and at least one external device of the plurality of external devices;

receive second device identification information from the at least one external device based on the detection of the connection;

compare the received second device identification information with the stored first device identification information;

control the at least one speaker to output a message in the setup information, wherein the at least one speaker is controlled based on the comparison of the stored first device identification information and the received second device identification information;

control the at least one audio capturing device to receive a user input based on the message, wherein the user input is a verbal input;

compare the received user input with at least one condition associated with the message; and transmit, to the AV reproduction device, information associated with a configuration setting from the plurality of configuration settings, based on the comparison of the received user input with the at least one condition associated with the message.

20. The user device according to claim 19, wherein the circuitry is further configured to control the at least one speaker to output a user guidance instruction, and wherein the user guidance instruction is associated with an unboxing operation of the AV reproduction device.

* * * * *